United States Patent
Ono et al.

(10) Patent No.: US 6,299,675 B1
(45) Date of Patent: Oct. 9, 2001

(54) PRINTING METHOD, IMAGE FORMING PROCESS, INK, INK SET, RECORDING UNIT, IMAGE FORMING APPARATUS AND PRINT

(75) Inventors: Eriko Ono, Kawasaki; Yoshihisa Takizawa, Machida, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/317,837

(22) Filed: May 25, 1999

(30) Foreign Application Priority Data

May 28, 1998 (JP) .................................. 10-147653

(51) Int. Cl.$^7$ ................................ C09D 11/02; B41J 2/01
(52) U.S. Cl. .................................. 106/31.27; 106/31.28; 106/31.6; 347/96; 347/98; 347/100
(58) Field of Search .................. 106/31.27, 31.28, 106/31.6; 347/96, 98, 100

(56) References Cited

U.S. PATENT DOCUMENTS

| | | | |
|---|---|---|---|
| 5,549,740 | * | 8/1996 | Takahashi et al. ............... 106/31.43 |
| 5,614,007 | * | 3/1997 | Kurabayashi et al. ........... 106/31.27 |
| 5,618,338 | * | 4/1997 | Kurabayashi et al. ........... 106/31.37 |
| 5,624,484 | * | 4/1997 | Takahashi et al. ............... 106/31.75 |
| 5,640,187 | | 6/1997 | Kashiwazaki et al. ............. 347/101 |
| 5,700,314 | * | 12/1997 | Kurabayashi et al. ........... 106/31.27 |
| 5,792,249 | * | 9/1998 | Shirota et al. .................... 106/31.27 |
| 5,835,116 | * | 11/1998 | Sato et al. ........................ 106/31.43 |
| 5,985,975 | * | 11/1999 | Kurabayashi et al. ........... 106/31.75 |
| 6,027,210 | | 2/2000 | Kurabayashi et al. ............. 347/100 |
| 6,036,307 | | 3/2000 | Hakamada et al. ................ 347/106 |
| 6,158,856 | | 12/2000 | Sato et al. ......................... 347/101 |

FOREIGN PATENT DOCUMENTS

| | | | |
|---|---|---|---|
| 0663299 | * | 7/1995 | (EP) . |
| 55-65269 | | 5/1980 | (JP) . |
| 55-66976 | | 5/1980 | (JP) . |
| 61-59911 | | 12/1986 | (JP) . |
| 61-59912 | | 12/1986 | (JP) . |
| 61-59914 | | 12/1986 | (JP) . |
| 63-22681 | | 1/1988 | (JP) . |
| 63-60783 | | 3/1988 | (JP) . |
| 63-299971 | | 12/1988 | (JP) . |
| 64-9279 | | 1/1989 | (JP) . |
| 64-63185 | | 3/1989 | (JP) . |
| 8/020720 | * | 1/1996 | (JP) . |
| 8-224955 | | 9/1996 | (JP) . |
| 11-48462 | | 2/1999 | (JP) . |

OTHER PUBLICATIONS

English translation of JP63/299971, Dec. 1988.*
Derwent abstract of JP08/020720, Jan. 1996.*
Shirota Katsuhiro, "Liquid Composition, Ink Set, Method and Device for Forming Image Using Them", esp@cenet—Document Bibliography and Abstract, JP 9–239964, Sep. 16, 1997, Abstract.

* cited by examiner

Primary Examiner—Helene Klemanski
(74) Attorney, Agent, or Firm—Fitzpatrick, Cella, Harper & Scinto

(57) ABSTRACT

Disclosed herein is a printing method comprising a step of applying a liquid composition containing a cationic substance and an ink containing an anionic substance respectively on a recording medium so that the liquid composition and the ink are in contact with each other on the recording medium, wherein the ink contains a coloring material at a concentration of not higher than 1% and has a pH of 10.5 or higher. The printing method permits the provision of an image having excellent water fastness, image quality and resistance to bleeding on plain paper and can prevent the occurrence of whitish haze at a highlight part.

75 Claims, 8 Drawing Sheets

PRINTING METHOD, IMAGE FORMING PROCESS, INK, INK SET, RECORDING UNIT, IMAGE FORMING APPARATUS AND PRINT

BACKGROUND OF THE INVENTION

1. Field of the Invention

The present invention relates to a technique capable of providing images having high water fastness in the formation of color images on plain paper, and particularly to an ink set comprising a liquid composition and an ink, which is suitable for use in the formation of images making good use of an ink-jet recording system, an image forming process and apparatus using this ink set, and an image formed article obtained by using these process and apparatus.

2. Related Background Art

An ink-jet recording method is a system in which recording is conducted by ejecting an ink to apply the ink to a recording medium such as paper. In particular, according to the ink-jet recording method disclosed in Japanese Patent Publication Nos. 61-59911, 61-59912 and 61-59914, in which an electrothermal converter is used as an ejection-energy supply means to apply thermal energy to an ink so as to generate bubbles, thereby ejecting droplets of the ink, the formation of a high-density multi-orifice in a recording head can be realized with ease, and high-resolution and high-quality images can be recorded at high speed.

However, the conventional inks used in the ink-jet recording method generally comprise water as a principal component, and include additionally a water-soluble high boiling solvent such as glycol for the purpose of preventing drying of the inks within nozzles, clogging at orifices, and the like. When such an ink has been used to conduct recording on a recording medium, therefore, there have been brought about problems that fixing ability cannot be sufficiently achieved, and image irregularity occurs, which appears to be attributed to the uneven distribution of a filler and a sizing agent on the surface of recording paper as the recording medium. In particular, when color images are intended to form, some inks of different colors are overlapped one after another. Therefore, color bleeding and uneven color mixing have occurred at portions of boundaries between images of different colors (this phenomenon will hereinafter be referred to as "bleeding" simply), resulting in a failure to obtain satisfactory images. In order to solve such problems, Japanese Patent Application Laid-Open No. 55-65269 discloses the addition of a compound capable of enhancing penetrability, such as a surfactant, into inks as a means for facilitating fixing ability of the inks. Besides, Japanese Patent Application Laid-Open No. 55-66976 discloses the use of inks comprising a volatile solvent as a principal component. However, the former method, in which the surfactant or the like is added to the inks, has involved a disadvantage that although the penetrability of the inks into recording paper is improved, and so the fixing ability and anti-bleeding property of the inks are improved to some extent, the image density and saturation of the resulting image are lowered because coloring materials contained in the inks also penetrate deeply into the recording paper. In addition, the inks have also involved a problem that they spread in lateral directions, resulting in deterioration of edge sharpness and resolution. On the other hand, the latter method, in which the inks comprising the volatile solvent as a principal component are used, has been liable to cause clogging due to the evaporation of the solvent in a nozzle of a recording head in addition to the above-described disadvantages attendant on the former method.

In order to improve the above-described problems, there have been additionally proposed methods in which a liquid composition, which can make the quality of images better, is applied to a recording medium prior to the jetting of an ink for recording images. For example, Japanese Patent Application Laid-Open No. 63-60783 discloses a method in which after a liquid composition containing a basic polymer is applied to a recording medium, an ink containing an anionic dye is applied thereto, thereby conducting recording. Japanese Patent Application Laid-Open No. 63-22681 discloses a recording method in which a first liquid composition containing a reactive chemical species and a second liquid composition containing a compound reacting with the reactive chemical species are mixed on a recording medium. Further, Japanese Patent Application Laid-Open No. 63-299971 discloses a method in which a liquid composition containing an organic compound having two or more cationic groups per molecule is applied to a recording medium, and recording is then conducted with inks containing an anionic dye. Japanese Patent Application Laid-Open No. 64-9279 discloses a method in which after an acidic liquid composition containing succinic acid or the like is applied to a recording medium, an ink containing an anionic dye is applied thereto, thereby conducting recording. Further, Japanese Patent Application Laid-Open No. 64-63185 discloses a method in which a liquid composition, which insolubilizes dyes, is applied to a recording medium prior to application of an ink.

However, all of these methods intend to prevent feathering of images or improve the water fastness of images by the deposition of the dyes themselves. Therefore, these methods are still insufficient in the effect to prevent the above-described bleeding between inks of different colors, and moreover poor in coverability of the inks on pulp fibers in the recording paper because the dyes deposited tend to distribute unevenly on the recording paper, resulting in lowering of evenness of images, so that the quality of characters printed may be deteriorated in some cases.

Therefore, Japanese Patent Application Laid-Open No. 8-224955 has proposed that a liquid composition containing a cationic substance is used in combination with an ink containing anionic compound, thereby obtaining an image high in optical density and good in image quality and water fastness and also in color reproducibility and resistance to bleeding.

On the other hand, it is known that when inks [for example, an ink containing a coloring material at a usual concentration (hereinafter referred to as "thick ink") and an ink containing a coloring material at a lower concentration (hereinafter referred to as "thin ink")], which have the same color tone, but are different from each other in concentration of coloring material, are used in combination in order to obtain an image high in gradation, the granular feeling of the inks is improved to provide an image of higher image quality. Further, a technique for obtaining an ink-jet recorded article of still higher quality by using a thick ink containing an anionic substance, a thin ink containing an anionic substance and a liquid composition containing a cationic substance is disclosed in, for example, Japanese Patent Application Laid-Open No. 11-48462.

SUMMARY OF THE INVENTION

The present inventors have carried out an extensive investigation as to the above-described technique for obtaining an ink-jet recorded article of still higher quality by using the thick ink containing an anionic substance, the thin ink containing an anionic substance and the liquid composition containing a cationic substance. As a result, it has been found that in some cases, white uneven image disorder (hereinafter referred to as "whitish haze") may occur at, for example, a portion of an image having a highlight part of a photograph-like image formed with a thin ink. This whitish haze is also observed at a portion of a secondary color produced by overlapping two thin inks of different color tones one after the other, and may be more marked in the portion of the secondary color than a portion of a single color in some cases. The present inventors have thus come to the conclusion that it is important to reduce or dissolve the occurrence of the whitish haze in order to obtain an image of still higher quality.

It is an object of the present invention to provide a printing method which can solve the problem, which may have been offered upon the provision of a print having excellent water fastness and character quality and lessened bleed by using an ink containing a coloring material at a lower concentration and a liquid composition capable of enhancing the fixing ability of the ink to a recording medium in combination, and specifically, can prevent the occurrence of whitish haze at, for example, a highlight part of a photograph-like image.

Another object of the present invention is to provide a process for forming a color image having a higher quality.

A further object of the present invention is to provide a process for forming a higher-quality image having excellent gradation in particular.

A still further object of the present invention is to provide a process for forming a multi-color image having a higher quality by using both thick ink and thin ink in each color of yellow, cyan and magenta.

A still further object of the present invention is to provide a process for forming a multi-color image having a higher quality by using both thick ink and thin ink in each color of yellow, cyan, magenta and black.

A yet still further object of the present invention is to provide an ink set which can prevent the occurrence of whitish haze at a highlight part of a photograph-like image, or the like.

A yet still further object of the present invention is to provide an ink set which can provide a color image having a higher quality.

A yet still further object of the present invention is to provide an ink set which can provide a multi-color image having a high quality.

A yet still further object of the present invention is to provide an ink set which can provide a multi-color image having a higher quality.

A yet still further object of the present invention is to provide a recording unit which can prevent the occurrence of whitish haze even at, for example, a highlight part of a photograph-like image and is suitably for use in the formation of a high-quality image.

A yet still further object of the present invention is to provide an image recording apparatus which can prevent the occurrence of whitish haze even at, for example, a highlight part of a photograph-like image and is suitably for use in the formation of a high-quality image.

A yet still further object of the present invention is to provide an ink which can prevent the occurrence of whitish haze in an image formed on a recording medium by using the ink in combination with a liquid composition containing a cationic compound.

A yet still further object of the present invention is to provide a print which has excellent water fastness and character quality, scarcely undergoes bleeding and is free from the occurrence of whitish haze or the like.

A yet still further object of the present invention is to provide a process for forming a high-quality image free from the occurrence of whitish haze or the like and excellent in gradation.

The above objects can be achieved by the present invention described below.

According to a first aspect of the present invention, there is thus provided a printing method comprising a step of applying a liquid composition containing a cationic substance and an ink containing an anionic substance respectively on a recording medium so that the liquid composition and the ink are in contact with each other on the recording medium, wherein the ink contains a coloring material at a concentration of not higher than 1% and has a pH of 10.5 or higher.

According to another aspect of the present invention, there is provided an image forming process comprising forming an image in an image forming region on a recording medium using inks of plural colors, which include at least one of an ink containing an anionic dye as a coloring material at a concentration of not higher than 1% and an ink containing an anionic compound and a pigment as a coloring material, the concentration of the coloring material of which is not higher than 1%, and a liquid composition containing a cationic substance, the process comprising the steps of:

(a) applying the liquid composition to the image forming region on the recording medium; and (b) applying the ink containing the coloring material at the concentration of not higher than 1% to the image forming region, wherein the ink containing the coloring material at the concentration of not higher than 1% has a pH of 10.5 or higher.

According to a further aspect of the present invention, there is provided an image forming process comprising a step of applying a liquid composition containing a cationic substance, a first ink containing an anionic substance and a second ink containing an anionic substance and having the same color tone as that of the first ink, the concentration of a coloring material contained in said second ink being lower than that of the first ink, respectively on a recording medium, wherein the step comprises a step of applying the second ink and the liquid composition respectively on the recording medium so that the second ink and the liquid composition are in contact with each other on the recording medium, and wherein the second ink contains the coloring material at a concentration of not higher than 1% and has a pH of 10.5 or higher.

According to still further aspect of the present invention, there is provided an image forming process comprising forming an image in an image forming region on a recording medium using inks of plural colors, which include two yellow inks containing an anionic substance, the concentrations of coloring materials of which are different from each other, two magenta inks containing an anionic substance, the concentrations of coloring materials of which are different from each other, and two cyan inks containing an anionic substance, the concentrations of coloring materials of which are different from each other, and a liquid composition containing a cationic substance, the process comprising the steps of:

(a) applying the liquid composition to the image forming region on the recording medium; and (b) applying the ink selected from among the yellow inks, the magenta inks and the cyan inks, the concentration of the coloring material of which is relatively low, to the image forming region, wherein the inks, the concentrations of the coloring materials of which are relatively low, all contain the respective coloring materials at concentrations of not higher than 1% and each have a pH of 10.5 or higher.

According to yet still further aspect of the present invention, there is provided an image forming process comprising forming an image in an image forming region on a recording medium using a plurality of inks of different colors, which include two yellow inks containing an anionic substance, the concentrations of coloring materials of which are different from each other, two magenta inks containing an anionic substance, the concentrations of coloring materials of which are different from each other, two cyan inks containing an anionic substance, the concentrations of coloring materials of which are different from each other, and two black inks containing an anionic substance, the concentrations of coloring materials of which are different from each other, and a liquid composition containing a cationic substance, the process comprising the steps of:

(a) applying the liquid composition to the image forming region on the recording medium; and (b) applying the ink selected from among the yellow inks, the magenta inks, the cyan inks and the black inks, the concentration of the coloring material of which is relatively low, to the image forming region, wherein the inks, the concentrations of the coloring materials of which are relatively low, all contain the respective coloring materials at concentrations of not higher than 1% and each have a pH of 10.5 or higher.

According to yet still further aspect of the present invention, there is provided an ink set comprising a liquid composition containing a cationic substance, and one or more inks containing an anionic substance, wherein the inks include at least one ink which contains a coloring material at a concentration of not higher than 1% and has a pH of 10.5 or higher.

In yet still further embodiment of the present invention, there is provided an ink set comprising in combination i) a liquid composition containing a cationic substance, and ii) inks including an ink containing an anionic dye, or a pigment and an anionic compound, wherein the inks are composed of inks of plural colors, including an ink which contains a coloring material at a concentration of not higher than 1% and has a pH of 10.5 or higher.

According to yet still further aspect of the present invention, there is provided an ink set comprising in combination i) a liquid composition containing a cationic substance, and ii) inks including an ink containing an anionic dye, or a pigment and an anionic compound, wherein the inks are composed of two yellow inks, the concentrations of coloring materials of which are different from each other, two magenta inks, the concentrations of coloring materials of which are different from each other, and two cyan inks, the concentrations of coloring materials of which are different from each other, wherein the yellow, magenta and cyan inks, the concentrations of the coloring materials of which are relatively low, all contain the respective coloring materials at a concentration of not higher than 1% and each have a pH of 10.5 or higher.

According to yet still further aspect of the present invention, there is provided an ink set comprising in combination i) a liquid composition containing a cationic substance, and ii) inks including an ink containing an anionic dye, or a pigment and an anionic compound, wherein the inks are composed of two yellow inks, the concentrations of coloring materials of which are different from each other, two magenta inks, the concentrations of coloring materials of which are different from each other, two cyan inks, the concentrations of coloring materials of which are different from each other, and two black inks, the concentrations of coloring materials of which are different from each other, wherein the yellow, magenta, cyan and black inks, the concentrations of the coloring materials of which are relatively low, all contain the respective coloring materials at a concentration of not higher than 1% and each have a pH of 10.5 or higher.

According to yet still further aspect of the present invention, there is provided a recording unit comprising a liquid container portion for containing a liquid composition containing a cationic substance, an ink container portion for containing at least one ink containing an anionic substance, and a head portion for ejecting the liquid composition and the ink respectively in the form of droplets, wherein the ink contains a coloring material at a concentration of not higher than 1% and has a pH of 10.5 or higher.

According to yet still further aspect of the present invention, there is provided an image forming apparatus comprising a recording unit, said recording unit being provided with a container portion for containing a liquid composition containing a cationic substance and at least one ink containing an anionic substance independently, and a head portion for ejecting the liquid composition and the ink respectively in the form of droplets, wherein the ink contains a coloring material at a concentration of not higher than 1% and has a pH of 10.5 or higher.

According to yet still further aspect of the present invention, there is provided an ink suitable for use in formation of an image together with a liquid composition containing a cationic substance, wherein the ink comprises a coloring material at a concentration of not higher than 1% and has a pH of 10.5 or higher.

According to yet still further aspect of the present invention, there is provided a print printed on a recording medium by the printing method described above.

According to yet still further aspect of the present invention, there is provided an image formed article formed on a recording medium by any one of the image forming processes described above.

According to yet still further aspect of the present invention, there is provided a printing method comprising a step of applying a liquid composition containing a cationic substance, a first ink containing an anionic substance and a second ink containing an anionic substance and having the same color tone as that of the first ink, the concentration of a coloring material contained in said second ink being lower than that of the first ink, respectively on a recording medium, wherein the step comprises a step of applying the liquid composition and the second ink respectively on the recording medium so that the liquid composition and the second ink are in contact with each other in a liquid state on the recording medium, and wherein the reactivity of the second ink to the liquid composition is lower than the reactivity of the first ink to the liquid composition.

The reason why such objects as described above can be achieved by the above aspects of the present invention is not known. However, extensive investigation as to the cause of the whitish haze made by the present inventors, has revealed that when a highlight part is formed with a thin ink containing an anionic substance in a conventional recording process using the thin ink and a liquid composition containing a cationic substance, i.e., an image forming process comprising the steps of (a) applying the liquid composition containing the cationic substance to a recording medium; and (b) ejecting one or more inks containing the anionic substance in the form of droplets from ejection orifices in response to recording signals to apply them to the recording medium, a reaction rate between the thin ink and the liquid composition becomes extremely fast because the number of anionic groups in the ink is extremely fewer than the number of cationic groups in the liquid composition, so that the anionic substance and the cationic substance undergo uneven aggregation on the recording medium to cause whitish haze. The present inventors consider that when the pH of the thin ink is adjusted to 10.5 or higher, its reaction with the cationic substance on the recording medium is inhibited, the reaction rate between the anionic substance in the ink and the cationic substance in the liquid composition is lowered, and the interaction between the anionic substance and the cationic substance is weakened, and so the uneven aggregation on the recording medium and the whitish haze caused by the aggregation can be effectively prevented.

DESCRIPTION OF THE PREFERRED EMBODIMENTS

Figure 1:
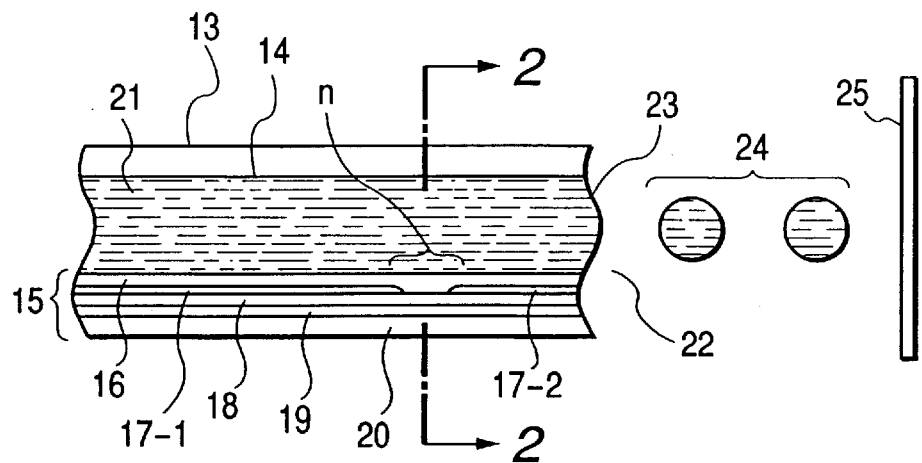
FIG. 1 is a longitudinal cross-sectional view of a head of an ink-jet recording apparatus.

The present invention will hereinafter be described in more detail by the preferred embodiments of the invention. The present invention relates to a printing method or image forming process comprising a step of applying a liquid composition containing a cationic substance and an ink containing an anionic substance respectively on a recording medium so that the liquid composition and the ink are in contact with each other on the recording medium, wherein the ink contains a coloring material at a concentration of not higher than 1% and has a pH of 10.5 or higher.

In the image forming process, it is preferred that a ratio per unit area of the cationic substance-containing liquid composition to the anionic substance-containing ink applied to the recording medium be within a range of from 1:10 to 8:10. When the ratio falls within this range, the occurrence of whitish haze in, for example, an image having a highlight part of a photograph-like image can be prevented.

In the image forming process, it is also preferred that the anionic-substance-containing ink be composed of color inks and a black ink, the quantities of the cationic-substance-containing liquid composition and the color inks ejected be controlled to each 2 to 40 ng per dot, and the quantity of the black ink ejected be controlled to 2 to 80 ng per dot, because the resulting image comes to have excellent image quality and resistance to bleeding.

In the present invention, it is only necessary that the liquid composition is ejected in a region containing at least an image forming region on a recording medium, and the image forming region does not always correspond to the ejection region of the liquid composition.

[Cationic-substance-containing liquid composition]

The liquid composition useful in the practice of the present invention will now be described. The liquid composition used in the present invention contains at least a cationic substance. The cationic substance used is preferably a high-molecular weight cationic compound, and the weight average molecular weight thereof is preferably within a range of from 400 to 1,400 as measured by means of gel permeation chromatography (GPC). According to such a high-molecular weight cationic compound, in the reaction of the liquid composition with the ink, the cationic compound adsorbs an association product of an anionic compound in a dye or pigment with a low-molecular weight cationic compound, or aggregate of the pigment into its molecule to further increase the size thereof. Therefore, the dye or pigment becomes hard to penetrate into the interfiber spaces of recording paper as a recording medium, whereby only a liquid portion separated from a solid portion penetrates into the recording paper to achieve the compatibility of improved print quality with improved fixing ability.

Accordingly, the viscosity of the cationic-substance-containing liquid composition is prevented from increasing, and so this liquid composition offers great advantages to ejection properties such as frequency response characteristic, stable ejection volume and stable ejection velocity when it is applied to a recording medium by means of the so-called On-Demand type thermal ink-jet recording apparatus having an ink-jet recording head, particularly, a recording head which applies thermal energy to an ink to eject droplets of the ink. In addition, since there is no need to use any polyvalent metal salt, advantages of causing no kogation, and so on are also mentioned as other effects of the present invention.

The molecular weight of the high-molecular weight substance in the present invention means an average molecular weight determined by GPC, and more specifically a weight average molecular weight in terms of polyethylene oxide, unless expressly noted. With respect to the molecular weight distribution of the cationic substance contained in the liquid composition used in the present invention, the compound itself may be subjected to GPC measurement in advance. Alternatively, the molecular weight distribution may be determined in the following manner. Namely, after the molecular weight distribution of the liquid composition itself is determined, a sufficient amount of an ink containing a water-soluble dye having an anionic group is mixed with the liquid composition under stirring in a beaker, and precipitate formed is removed. Thereafter, the GPC measurement is conducted again to compare the measurement results before the mixing with the ink and after the mixing with the ink to remove the precipitate with each other, whereby the molecular weight distribution of the cationic compound is found from the molecular weight distribution of the component precipitated by the dye in the ink and removed from the system.

As examples of the high-molecular weight cationic substance, may be mentioned polyallylamine, polyamine sulfone, polyvinylamine, chitosan, and neutralized products or partially neutralized products of these compounds with an acid such as hydrochloric acid or acetic acid. It goes without saying that the high-molecular weight cationic substance is not limited to these substances. Of these, polyallylamine is particularly preferred.

In the present invention, a compound obtained by partially cationizing a nonionic polymeric substance may be used as the high-molecular weight cationic substance. As specific examples of such a substance, may be mentioned copolymers of vinylpyrrolidone and an aminoalkylalkylate quaternary salt, and copolymers of acrylamide and an aminomethylacrylamide quaternary salt. It goes without saying that the polymeric substances are not limited to these compounds. If the above-described polymeric compounds and cationic polymeric substances are soluble in water, there is nothing to be said against them. However, they may be in the form of a dispersion such as latex or emulsion.

As other cationic compounds, the following compounds may also be preferably used. Examples thereof include primary, secondary and tertiary amine salt type compounds, specifically, the hydrochlorides and acetates of dodecylamine, coconut amine, stearylamine, rosin amine and the like; quaternary ammonium salt type compounds, specifically, dodecyltrimethylammonium chloride, dodecylbenzyltrimethylammonium chloride, dodecyldimethylbenzylammonium chloride, stearyl-trimethylammonium chloride, benzyltributylammonium chloride, benzalkonium chloride and cetyltrimethylammonium chloride; pyridinium salt type compounds, specifically, cetylpyridinium chloride and cetylpyridinium bromide; imidazoline type cationic compounds, specifically, 2-heptadecenyl-hydroxyethyl-imidazoline; and ethylene oxide adducts of higher alkylamines, specifically, dihydroxyethylstearylamine. Of these, the cationic compounds containing a quaternary ammonium group having an alkyl group having at least 8 carbon atoms are preferred, with benzalkonium chloride being particularly preferred.

In the present invention, amphoteric surfactants exhibiting cationic nature in a certain pH region may also be used. Examples thereof include amino acid type amphoteric surfactants, i.e., compounds of the R—NH—CH$_2$—CH$_2$—COOH type; carboxylic acid salt type amphoteric surfactants such as betaine type compounds of stearyldimethylbetaine, dodecyldihydroxyethylbetaine and the like; and besides amphoteric surfactants of the sulfuric ester type, sulfonic acid type, phosphoric ester type and the like. When these amphoteric surfactants are used, it goes without saying that the liquid composition must be adjusted either so as to have a pH not higher than their isoelectric point or so as to reach the pH not higher than the isoelectric point when mixed with the ink on a recording medium.

Although the examples of the cationic substances have been mentioned above, the cationic substances usable in the present invention are not always limited to these compounds.

The amount of the cationic substance contained in the liquid composition is preferably within a range of from 0.05 to 20% by weight, more preferably from 0.5 to 5% by weight based on the total weight of the liquid composition. It is however necessary to determine an optimum range according to the combination of the individual substances to be used.

The liquid composition used in the present invention generally comprises water, a water-soluble organic solvent and other additives in addition to the above-described cationic substance.

Examples of the water-soluble organic solvent used include amides such as dimethylformamide and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, thiodiglycol, hexylene glycol and diethylene glycol; lower alkyl ethers of polyhydric alcohols, such as ethylene glycol methyl ether, diethylene glycol monomethyl ether and triethylene glycol monomethyl ether; monohydric alcohols such as ethanol, isopropyl alcohol, n-butyl alcohol and isobutyl alcohol; and besides, 1,2,6-hexanetriol, glycerol, N-methyl-2-pyrrolidone, 1,3-dimethylimidazolidinone, triethanolamine, sulfolane and dimethyl sulfoxide. No particular limitation is imposed on the content of the water-soluble organic solvent. However, it is preferably within a range of from 5 to 60% by weight, more preferably from 5 to 40% by weight based on the total weight of the liquid composition.

Besides the above components, additives such as viscosity modifiers, pH adjustors, antiseptics, surfactants, antioxidants and evaporation accelerators may be suitably incorporated as needed. The selection of the surfactants is particularly important from the viewpoint of controlling the penetrability of the liquid composition into a recording medium.

The liquid composition used in the present invention is preferably colorless, but may be palely colored so far as the color tones of color inks are not changed when it is mixed with the respective inks on a recording medium or the like. With respect to preferable physical property ranges at about 25° C. of such a liquid composition as described above, the pH may be within a range of from 3 to 12, preferably from 3 to 10, more preferably from 3 to 8, the surface tension may be within a range of from 10 to 60 dyne/cm, preferably 10 to 40 dyne/cm, and the viscosity may be within a range of from 1 to 30 cP.

[Ink]

The inks used in the present invention will now be described. The inks used in the present invention comprise at least one ink containing an anionic substance. At least one ink of these inks is preferably a thin ink containing a coloring material at a concentration of not higher than 1% and having a pH of 10.5 or higher. According to such an ink, for example, a highlight part of a photograph-like image can be printed on a recording medium with good reproducibility, and the occurrence of whitish haze can be prevented even when it is mixed with the cationic-substance-containing liquid composition on a recording medium.

For prints of which high gradation is required, for example, prints of photograph-like images, both thick ink and thin ink may preferably be used as to each of some colors, for example, yellow, magenta, cyan and black. With respect to the thick ink, it is preferred that the concentration of a coloring material contained therein be controlled to 2% by weight or higher based on the total weight of the ink.

With respect to the thin ink on the other hand, it is particularly preferred that the concentration of a coloring material be controlled to 1% by weight or lower based on the total weight of the ink in that the delicate gradation of, for example, a photograph-like image can be reproduced to an extremely high degree. The pH of the thick ink may not be always adjusted to 10.5 or higher, but be preferably 12 or lower from the viewpoints of corrosion of a head and a tank, and the like.

As described above, the pH of the thin ink is adjusted to 10.5 or higher, whereby a rapid reaction between anions and cations can be prevented even when the ink comes into contact with the above-described liquid composition in a liquid state on a recording medium. Therefore, the occurrence of whitish haze can be effectively prevented. Since the interaction between the thin ink and the liquid composition may become vigorous according to the kind of the coloring material used in the thin ink, the pH of the thin ink is preferably adjusted to 10.7 or higher taking account of a margin. When the thin inks of all colors used in the formation of images have a pH of 10.5 or higher, preferably 10.7 or higher, the whitish haze can be prevented to a marked extent upon the production of secondary colors in particular. With respect to the thin inks, the pH is preferably 12 or lower from the viewpoints of corrosion of a head and a tank, and the like.

In order to adjust the pH of each ink, a pH adjustor may be added to the ink. Examples of the pH adjustor include various kinds of organic amines such as diethanolamine and triethanolamine; inorganic alkalis such as the hydroxides of alkali metals, for example, sodium hydroxide, lithium hydroxide and potassium hydroxide; and organic acids and mineral acids.

The inks used in the present invention comprise a water-soluble dye having an anionic group, which is an anionic dye, water, a water-soluble organic solvent and other components, for example, a viscosity modifier, pH adjustor, antiseptic, surfactant, antioxidant, etc., as needed.

[Coloring material in ink]

Coloring materials used in the present invention are water-soluble dyes having an anionic group or pigments.

[Water-soluble anionic dye]

No particular limitation is imposed on the water-soluble dyes having an anionic group used in the present invention so far as they are, for example, water-soluble acid dyes, direct dyes or reactive dyes, which are described in Color Index. Any dyes not described in Color Index may also be used without any particular limitation so far as they have an anionic group, for example, a sulfonic group or a carboxylic group. Among the water-soluble dyes used herein, those having dependence of solubility on pH may also be included.

[Pigment plus anionic compound]

As another embodiment of such an ink, a pigment and an anionic compound may be used in place of the water-soluble dye having an anionic group to provide an ink further comprising water, a water-soluble organic solvent and other optional components, for example, a viscosity modifier, pH adjustor, antiseptic, surfactant, antioxidant, etc. In this ink, the anionic compound may be a dispersing agent for the pigment. When a dispersing agent for the pigment is not anionic, another anionic compound, not the dispersing agent, may be added. It goes without saying that even when the dispersing agent is anionic, an additional anionic compound may be added.

[Pigment]

No particular limitation is imposed on pigments usable in the present invention. However, for example, the following pigments are preferably used.

[Black pigment]

As carbon black used in black pigment inks, may be used that produced in accordance with the furnace process or channel process and having such properties that the primary particle diameter is from 15 to 40 $\mu$m, the specific surface area is from 50 to 300 m$^2$/g as measured by the BET method, the oil absorption is from 40 to 150 ml/100 g as determined by using DBP, the volatile matter is from 0.5 to 10%, and the pH is from 2 to 9. Examples of commercially-available carbon black having such properties include No. 2300, No. 900, MCF88, No. 40, No. 52, MA7, MA8 and No. 2200B (all, products of Mitsubishi Chemical Industries Limited), RAVEN 1255 (product of Columbian Carbon Japan Limited), REGAL 400R, REGAL 660R and MOGUL L (all, products of CABOT Co.), and Color Black FW1, Color Black FW18, Color Black S170, Color Black S150, Printex 35 and Printex U (all, products of Degussa AG). Those newly prepared for the practice of the present invention may also be used.

[Yellow pigment]

Examples of pigments used in yellow inks include C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83.

[Magenta pigment]

Examples of pigments used in magenta inks include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 112 and C.I. Pigment Red 122.

[Cyan pigment]

Examples of pigments used in cyan inks include C.I. Pigment Blue 1, C.I. Pigment Blue 2, C.I. Pigment Blue 3, C.I. Pigment Blue 15, C.I. Pigment Blue 16, C.I. Pigment Blue 22, C.I. Vat Blue 4 and C.I. Vat Blue 6.

With respect to each color, those newly prepared for the practice of the present invention may also be used. It is preferred that these pigments be used within a range of from 1 to 20% by weight, preferably from 2 to 12% by weight based on the total weight of the ink.

[Dispersing agent for pigment]

As a dispersing agent for pigment contained in the inks used in the present invention, any resin may be used so far as it is soluble in water. However, those having a weight average molecular weight ranging from 1,000 to 30,000, more preferably from 3,000 to 15,000 may preferably be used. Specific examples of such water-soluble resins include block copolymers, graft copolymers and random copolymers composed of at least one selected from among hydrophobic monomers such as styrene, styrene derivatives, vinylnaphthalene, vinylnaphthalene derivatives and aliphatic alcohol esters of $\alpha,\beta$-ethylenically unsaturated carboxylic acids, and at least one selected from among hydrophilic monomers such as acrylic acid and derivatives thereof, maleic acid and derivatives thereof, itaconic acid and derivatives thereof, and fumaric acid and derivatives thereof, and salts of these copolymers. These resins are alkali-soluble resins which dissolve in an aqueous solution of a base. Besides, homopolymers composed of a hydrophilic monomer, and salts thereof may also be used. Further, water-soluble resins such as polyvinyl alcohol, carboxymethyl cellulose and condensates of naphthalenesulfonic acid and formaldehyde may also be used. However, it is preferred to use the alkali-soluble resins in that the viscosity of the resulting dispersion can be made lower, and dispersing operation is also easier. These water-soluble resins are preferably used within a range of from 0.1 to 5% by weight based on the total weight of the ink.

Such pigment and water-soluble resin as described above are dispersed or dissolved in an aqueous medium. The aqueous medium preferably used in the pigment inks according to the present invention is a mixed solvent of water and a water-soluble organic solvent. As the water, it is preferable to use ion-exchanged water (deionized water) instead of tap water containing various ions.

When the dispersing agent is not an anionic polymer, it is necessary to further add an anionic compound to the above-described pigment-containing inks. Examples of anionic compounds preferably used in the present invention include low-molecular weight anionic surfactants in addition to high-molecular weight substances such as the alkali-soluble resins described in the item of [Dispersing agent for pigment].

Specific examples of the low-molecular weight anionic surfactants include disodium lauryl sulfosuccinate, disodium polyoxyethylene lauroylethanol-amide sulfosuccinate, disodium polyoxyethylene alkyl-sulfosuccinate, carboxylated polyoxyethylene lauryl ether sodium salt, carboxylated polyoxyethylene tridecyl ether sodium salt, sodium polyoxyethylene lauryl ether sulfate, triethanolamine polyoxyethylene lauryl ether sulfate, sodium polyoxyethylene alkyl ether sulfates, sodium alkylsulfates and triethanolamine alkylsulfates. However, the low-molecular weight anionic surfactants are not limited to these compounds.

The used amount of such an anionic substance as described above is preferably within a range of from 0.05 to 10% by weight, more preferably from 0.05 to 5% by weight based on the total weight of the ink.

As the pigment used in the present invention, a self-dispersing type pigment which has no need to use any dispersing agent may also be used. The self-dispersing type pigment is a pigment to the surface of which at least one hydrophilic group is bonded directly or through another atomic group. The hydrophilic group may be at least one selected from among the following hydrophilic groups, and said another atomic group may be an alkylene group having 1 to 12 carbon atoms, a phenylene group which may be substituted, or a naphthylene group which may be substituted.

—COOM, —SO$_3$M, —SO$_2$NH$_2$, —PO$_3$HM, —PO$_3$M$_2$ and —SO$_2$NHCOR wherein M is hydrogen, alkali metal, ammonium or organic ammonium, and R is an alkyl group having 1 to 12 carbon atoms, a phenyl group which may be substituted, or a naphthyl group which may be substituted.

Besides the above components, a surfactant, antifoaming agent, antiseptic and the like may be suitably added to the pigment inks according to the present invention, as needed, to provide them as inks having desired physical properties. A commercially available water-soluble dye or the like may also be added.

Examples of the surfactant include anionic surfactants such as fatty acid salts, salts of higher alcohol sulfuric esters, salts of liquid fatty oil sulfuric esters and alkylarylsulfonic acid salts; and nonionic surfactants such as polyoxyethylene alkyl ethers, polyoxyethylene alkyl esters, polyoxyethylene sorbitan alkyl esters, acetylene alcohol and acetylene glycol. One or more of these surfactants may be suitably chosen for use. The amount of the surfactant used varies according to the kind of the dispersing agent used, but is desirably within a range of from 0.01 to 5% by weight based on the total weight of the ink. At this time, it is desired that the amount of the surfactant added is determined in such a manner that the surface tension of the resulting ink is at least 30 dyne/cm, since the occurrence of slippage upon printing (defective ink-droplet impact) due to wetting of an orifice can be effectively prevented in a recording system like that used in the present invention.

Such a pigment ink as described above is prepared in the following manner. A pigment is first added to an aqueous medium containing at least a resin as a dispersing agent and water, and the mixture is stirred. A dispersion treatment is then conducted in accordance with a dispersing technique described below, and as needed, a centrifugal treatment is carried out to obtain a desired dispersion. Such components as mentioned above are then added to the dispersion, and the resultant mixture is stirred to prepare an ink.

When the alkali-soluble resin is used, it is necessary to add a base for dissolving the resin in the dispersion. The amine or base for dissolving the resin must be added in an amount at least once as much as the amount of an amine or base determined by calculation from the acid value of the resin. This amount of the amine or base is determined in accordance with the equation Amount (g) of amine or base=[(acid value of the resin)×(molecular weight of the amine or base)×(amount of the resin)(g)]/ 5600.

It is effective to conduct premixing for at least 30 minutes before the aqueous medium containing the pigment is subjected to the dispersion treatment. This premixing serves to improve the wettability of the surface of the pigment and facilitate adsorption of the dispersing agent on the pigment surface.

Preferable examples of the base added to the dispersion in the case where the alkali-soluble resin is used include organic amines such as monoethanolamine, diethanolamine, triethanolamine, aminomethylpropanol and ammonia, and inorganic bases such as potassium hydroxide and sodium hydroxide.

On the other hand, any dispersing machine routinely used may be employed as a dispersing machine used in the present invention. Examples thereof include ball mills, sand mills, etc.

Of these mills, a high-speed sand mill may preferably be used. Examples thereof include Super Mill, Sand Grinder, Beads Mill, Agitator Mill, Grain Mill, Dynol Mill, Pearl Mill and Coball Mill (all, trade names).

To the inks according to the present invention, may be added various kinds of additives such as water-soluble organic solvents, surfactants, pH adjusters, rust preventives, mildewproofing agents, antioxidants, evaporation accelerators, chelating agent and water-soluble polymers in addition to the above-described components, as needed.

[Aqueous medium]

A liquid medium dissolving or dispersing the above-described coloring material used in the present invention therein is preferably a mixture of water and a water-soluble organic solvent. Specific examples of the water-soluble organic solvent include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones such as acetone; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether and diethylene glycol monomethyl (or monoethyl) ether; N-methyl-2-pyrrolidone; 1,3-dimethyl-2-imidazolidinone; sulfolane; dimethyl sulfoxide; cyclic amide compounds such as 2-pyrrolidone and ε-caprolactam; and imide compounds such as succinimide.

The content of the water-soluble organic solvent in each ink is generally within a range of from 1 to 40% by weight, preferably from 3 to 30% by weight based on the total weight of the ink, while the content of water in the ink is within a range of from 30 to 95% by weight. If the amount of water is less than 30% by weight, the solubility of the coloring material is deteriorated, and the viscosity of the resulting ink is increased. It is hence not preferable to use water in such a small amount. If the amount of water is greater than 95% by weight on the other hand, the vaporizing component is too much to satisfy sufficient crusting property.

The inks according to the present invention may also be used for general water-soluble writing utensils, but are particularly suitable for use in an ink-jet recording system of a type that an ink is ejected by the bubbling phenomenon of the ink caused by thermal energy. This recording system has a feature that the ejection of the ink becomes extremely stable, and no satellite dots generate. In this case, the thermal properties (for example, the specific heat, the coefficient of thermal expansion, the heat conductivity, etc.) of the inks may however be controlled in some cases.

The inks according to the present invention may desirably be controlled so as to have, as their own physical properties at 25° C., a surface tension of 30 to 68 dyne/cm and a viscosity of 15 cP or lower, preferably 10 cP or lower, more preferably 5 cP or lower from the viewpoints of solving the problem of water fastness of printed images when printed on plain paper or the like, and at the same time making the matching of the inks with a head for ink-jet recording.

In the present invention, the ink set means a combination of the liquid composition containing a cationic substance and one or more inks containing an anionic substance. On the other hand, a combination of said one or more inks that the cationic-substance-containing liquid composition is excluded from the ink set is referred to as an ink subset. The inks used in the ink set according to the present invention are one or more inks containing an anionic substance. At least one ink of these inks is a thin ink containing a coloring material at a concentration of not higher than 1% and having a pH of 10.5 or higher.

The printing method and image forming process according to the present invention will now be described. The process for applying the liquid composition and ink(s) prepared in the above-described manner to a recording medium will be first described.

The printing method and image forming process according to the present invention comprise the steps of (A) applying the cationic-substance-containing liquid composition to a recording medium and (B) ejecting inks of one or more colors containing an anionic substance in the form of droplets on the recording medium from ejection orifices in response to recording signals to apply them to the recording medium.

The step (A) is conducted for the purpose of improving the character quality and fixing ability of an image formed by the step (B), preventing the occurrence of bleeding and improving the water fastness of the image. The step (A) may be conducted either prior to the step (B) or after the step (B). Even when either step is first conducted, the cationic substance in the liquid composition is mixed with the anionic substance in the ink on the recording medium to form aggregate. From the viewpoints of improving optical density and fixing ability, it is preferred that the step (A) be conducted after the step (B), and the step (B) be further conducted subsequently thereto.

In the case where the step (A) is conducted prior to the step (B), no particular limitation is imposed on the time period from the prior application of the liquid composition to the subsequent application of the ink. In order to perform the present invention more effectively, however, it is desirable to apply the ink within several seconds, particularly preferably, within one second. The same shall apply to the case where the step (A) is conducted after the step (B).

As a method for applying the liquid composition and the inks to a recording medium, various kinds of ink-jet recording systems may be used. However, the above-described so-called On-Demand type thermal ink-jet system, in which bubbles generated by thermal energy are used to eject droplets, is particularly preferred.

In order to obtain a print or image formed article having high gradation, it is preferred to use both thin ink and thick ink as inks as described above. The thin ink and the thick ink are applied according to the desired gradation value, or so as to achieve linear tone representation, thereby forming dots of the only thick ink, dots of both the thin ink and thick ink, and dots of the only thin ink on a recording medium. The cationic-substance-containing liquid composition is applied on the recording medium so that it comes into contact with the respective inks on the recording medium. Specifically, the liquid composition is applied to, for example, an area in which dots of the respective inks are formed, or an area adjacent to this area. It is preferred that a ratio per unit area of the liquid composition to the thin ink on the recording medium including an area to which dots of the thin ink are applied be within a range of from 1:10 to 8:10 (liquid composition:ink). More specifically, when the mixing ratio falls within this range, the prevention of occurrence of whitish haze is compatible with excellent water fastness and resistance to bleeding of the resulting printed image, and high image quality.

When at least one color ink selected from among yellow, magenta and cyan inks, and a black ink are used at this time, the quantities of the liquid composition and the color ink ejected are controlled to each 2 to 40 ng per dot, and the quantity of the black ink ejected is controlled to 2 to 80 ng per dot, the excellent results can be achieved in image quality and resistance to bleeding of images.

When the ejection quantities of these composition and inks are preset to the respective ranges described above, the liquid composition can be fully reacted with the inks. In addition, the inks can also be prevented from spreading on a recording medium, and so the occurrence of a phenomenon that a sufficient optical density of image cannot be achieved can be prevented.

Figure 2:
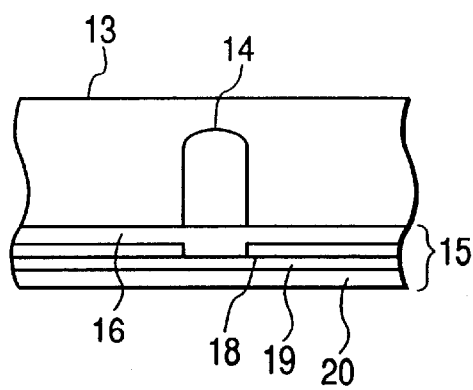
FIG. 2 is a transverse cross-sectional view of the head of the ink-jet recording apparatus.
Figure 3:
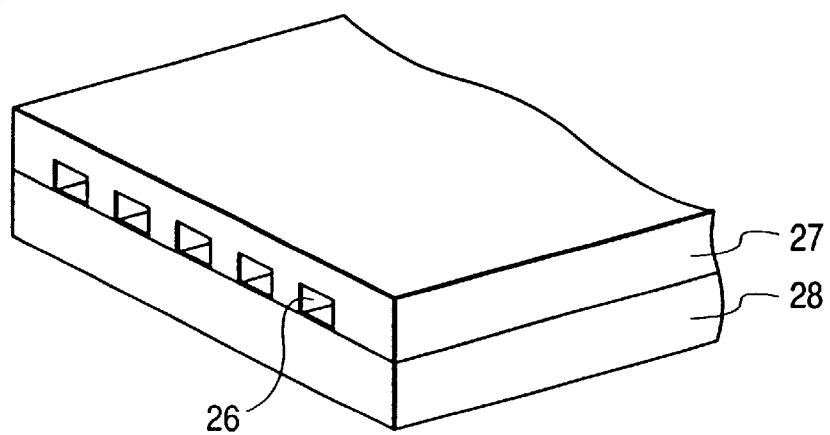
FIG. 3 is a perspective view of the appearance of another head of the ink-jet recording apparatus.

Recording apparatus used in the image forming processes according to the present invention will now be described. In the present invention, as an example thereof, may be mentioned an ink-jet recording method and apparatus in which thermal energy corresponding to recording signals is applied to an ink within a recording head to eject droplets of the ink by the thermal energy. Examples of the construction of a recording head, which is a main component of such an apparatus, are illustrated in FIGS. 1, 2 and 3.

A head 13 is formed by bonding a glass, ceramic or plastic plate or the like having a groove 14 through which an ink is passed, to a heating head 15 used for thermal recording (the drawings show a head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 due to a pressure not illustrated.

Now, upon application of electric signals to the electrodes 17-1 and 17-2, the heating head 15 rapidly generates heat at the region shown by n to form bubbles in the ink 21 which is in contact with this region. The meniscus 23 of the ink is projected by the pressure thus generated, and the ink 21 is ejected from the ejection orifice 22 toward a recording medium 25 in the form of minute droplets 24.

FIG. 3 illustrates an appearance of a multi-head composed of an array of a number of heads as shown in FIG. 1. The multi-head is formed by closely bonding a glass plate 27 having a number of grooves 26 to a heating head 28 similar to the head illustrated in FIG. 1.

Incidentally, FIG. 1 is a cross-sectional view of the head 13 taken along the flow path of the ink, and FIG. 2 is a cross-sectional view taken along line 2—2 in FIG. 1.

Figure 4:
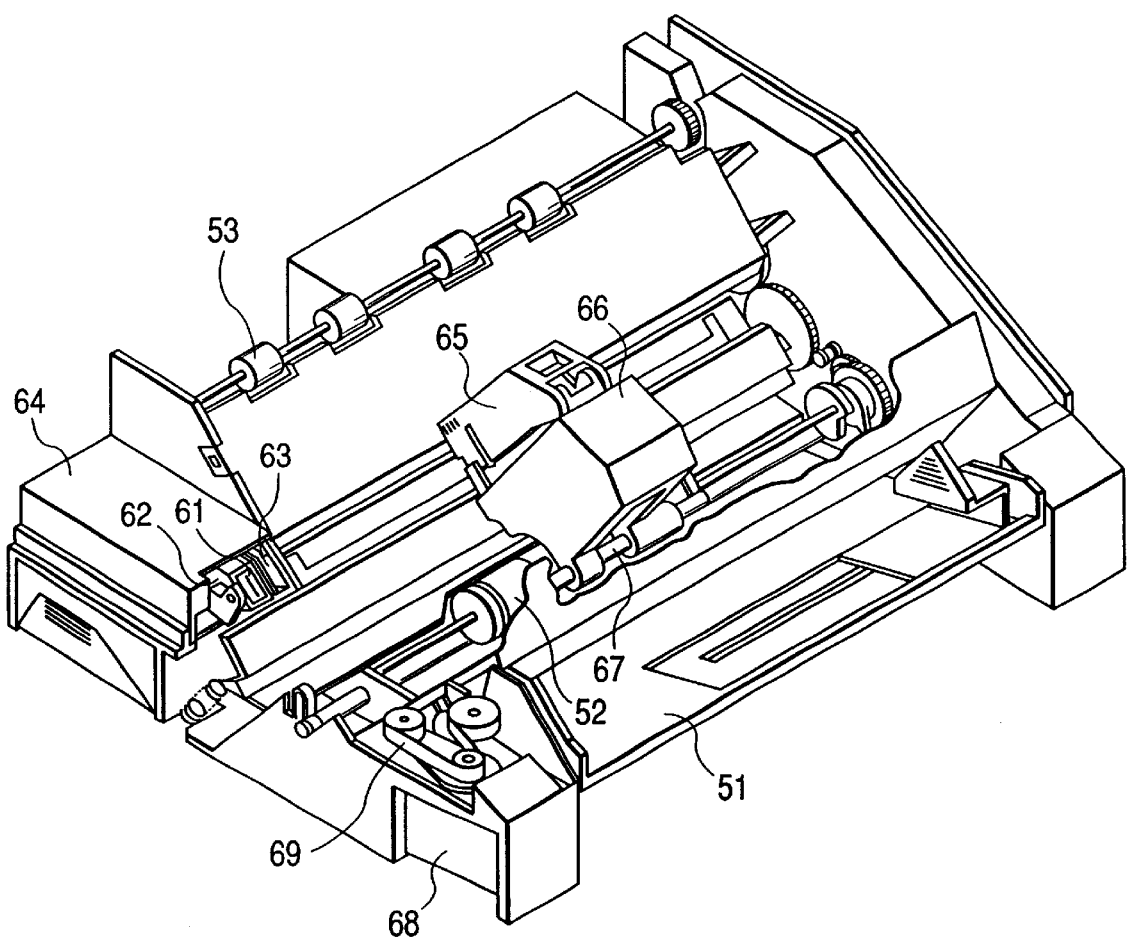
FIG. 4 is a perspective view of an illustrative ink-jet recording apparatus.

FIG. 4 illustrates an example of an ink-jet recording apparatus in which such a head has been incorporated. In FIG. 4, reference numeral 61 designates a blade serving as a wiping member, one end of which is a stationary end held by a blade-holding member to form a cantilever. The blade 61 is provided at a position adjacent to a region in which a recording head 65 operates.

In this embodiment, the blade 61 is held in such a form that it protrudes into the course through which the recording head 65 is moved. Reference numeral 62 indicates a cap, which is provided at a home position adjacent to the blade 61, and is so constructed that it moves in a direction perpendicular to a direction in which the recording head 65 is moved, and comes into contact with a face of ejection openings of the recording head 65 to cap it. Reference numeral 63 denotes an ink-absorbing member provided adjoiningly to the blade 61 and, similar to the blade 61, held in such a form that it protrudes into the course through which the recording head 65 is moved. The above-described blade 61, cap 62 and absorbing member 63 constitute a head recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a feeding part from which the recording media are separately inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
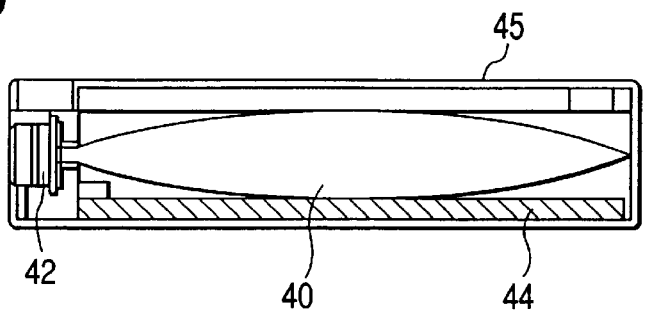
FIG. 5 is a longitudinal cross-sectional view of an ink cartridge.

FIG. 5 illustrates an exemplary ink cartridge 45 in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred that the ink container portion be formed of a polyolefin, in particular, polyethylene, at its surface with which the ink comes into contact.

The ink-jet recording apparatus used in the present invention are not limited to the apparatus as described above in which the head and the ink cartridge are separately provided. Therefore, a device in which these members are integrally formed as shown in FIG. 6 can also be preferably used.

Figure 6:
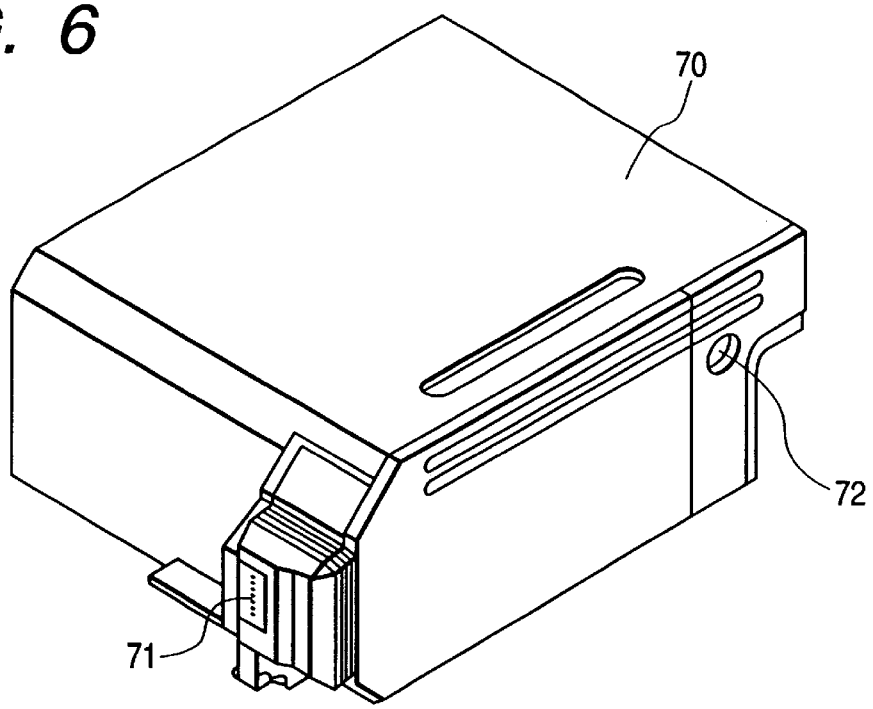
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets from a head 71 having a plurality of orifices. In the present invention, polyurethane, cellulose or polyvinyl acetate is preferably used as a material for the ink-absorbing member.

Reference numeral 72 indicates an air passage for communicating the interior of the recording unit 70 with the atmosphere. This recording unit 70 can be used in place of the recording head 65 shown in FIG. 4, and is detachably installed on the carriage 66.

Incidentally, in the recording apparatus used in the present invention, the ink-jet recording apparatus in which thermal energy is applied to an ink to eject droplets of the ink has been described by way of example. However, the present invention can also be used in other ink-jet recording apparatus such as a piezo-system using a piezoelectric element.

Figure 7:
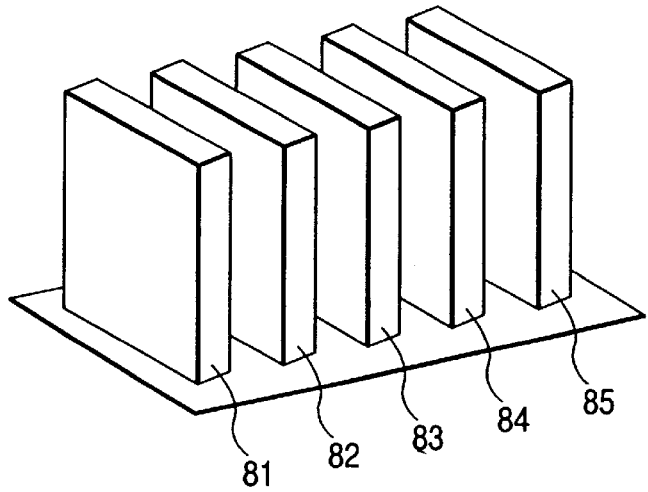
FIG. 7 is a perspective view illustrating a recording unit in which a plurality of recording heads are arranged.
Figure 11:
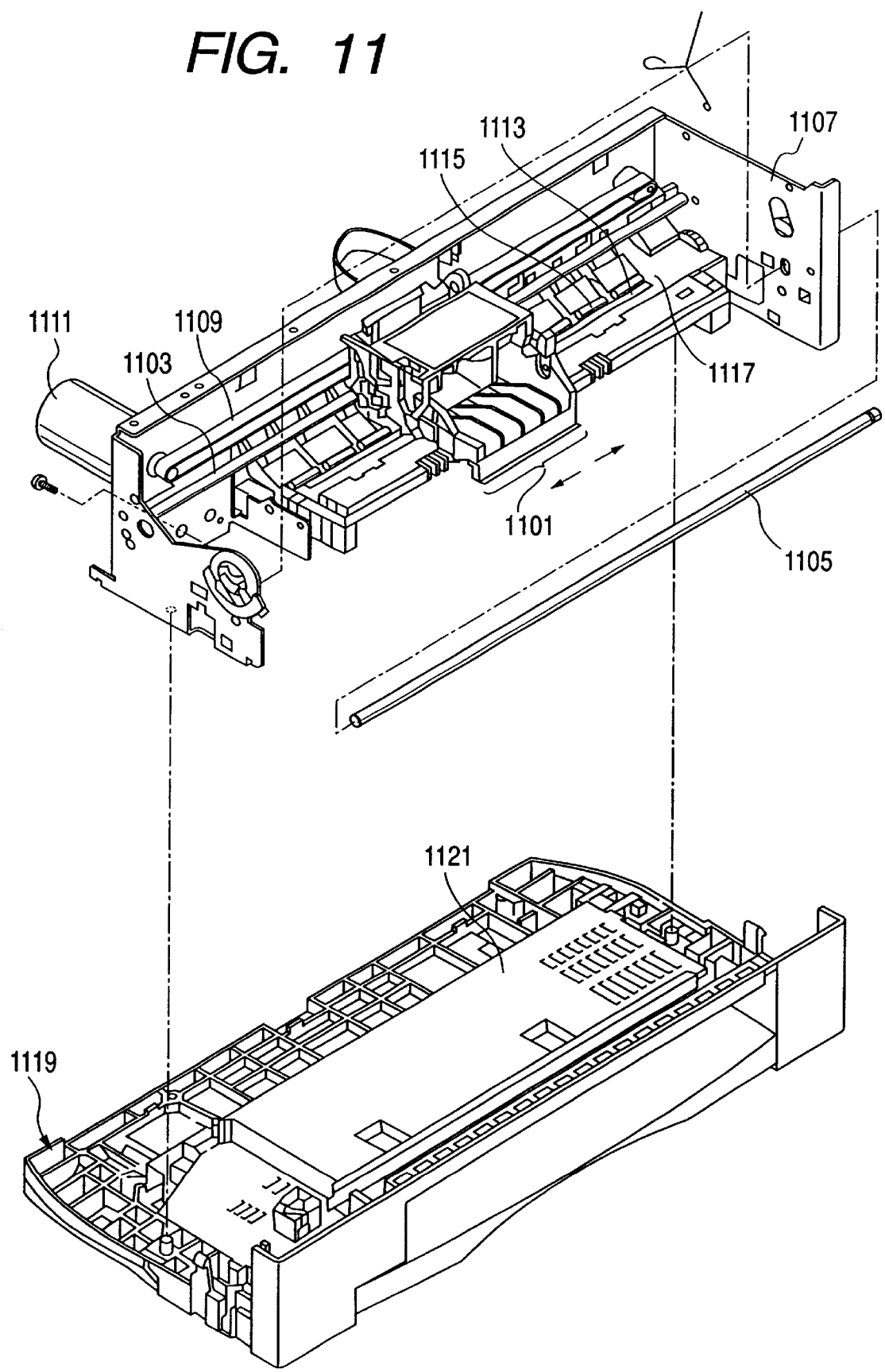
FIG. 11 is a schematic perspective view of another ink-jet recording apparatus.

In the case where the image forming process according to the present invention is carried out, for example, a recording apparatus in which five recording heads, each of which has been illustrated in FIG. 3, are arranged on a carriage, is used. An example thereof is illustrated in FIG. 7. Reference numerals 81, 82, 83 and 84 indicate recording heads for ejecting thick and thin yellow inks, thick and thin magenta inks, thick and thin cyan inks, and thick and thin black inks, respectively. Reference numeral 85 designates a head for ejecting a liquid composition. The heads are arranged in the above-described recording apparatus and serve to eject the respective recording inks of the different colors according to recording signals. Before the ejection of the inks, the liquid composition is applied in advance at least to the portions of recording paper where the recording inks of the different colors are to be applied thereto. FIG. 7 shows the case where the five recording heads are used. More specifically, these recording heads are mounted on, for example, a carriage 1101 in an ink-jet recording apparatus illustrated in FIG. 11 to conduct color printing. The carriage 1101 is slidably supported by a guide shaft 1103 and a support shaft 1105, and the guide shaft 1103 and the support shaft 1105 are extended between both side walls of a chassis 1107. The driving force for the carriage 1101, which reciprocatively moves in main scanning directions along both shafts, is given by a motor 1111 for the carriage through a drive belt 1109.

Figure 8:
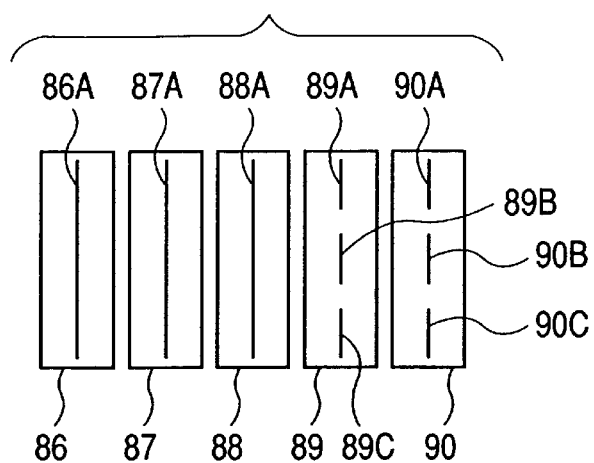
FIG. 8 illustrates the arrangements of recording heads and ejection openings according to an embodiment.

The holding and conveyance of a recording medium such as paper (not illustrated) is made by a platen roller 1113 and pinch roller 1115 to convey the recording medium on a platen 1117. At this time, a recording head portion (not illustrated) of each recording head mounted on the carriage 1101 projects downward from the carriage so that an ejection opening face of the recording head portion faces in parallel with the recording medium on the platen 1117. Incidentally, a tank 1121 for waste inks is provided in a main body 1119 to which the chassis 1107 is fixed. FIG. 8 is a schematic view illustrating a state that five recording heads have been mounted on the carriage 1101 of the ink-jet recording apparatus illustrated in FIG. 11 as viewed from the side of respective nozzles from which inks are ejected. In FIG. 8, reference numeral 86 indicates a head from which a liquid composition is ejected. The head 86 is provided with an array of ejection openings 86A. The array of ejection openings 86A is composed of, for example, 304 ejection openings at intervals of 600 dpi. Similarly, reference numerals 87 and 88 indicate heads from which a thick black ink and a thin black ink are ejected, respectively. These heads 87 and 88 are provided with the same arrays of ejection openings 87A and 88A as the array of ejection openings 86A, respectively. Reference numeral 89 indicates a head from which thick yellow, magenta and cyan inks are ejected. The head 89 is provided with arrays of ejection openings 89A, 89B and 89C from which the yellow, magenta and cyan inks are ejected, respectively. The arrays of ejection openings 89A, 89B and 89C are each composed of, for example, 80 ejection openings at intervals of 600 dpi. Reference numeral 90 indicates a head from which thin yellow, magenta and cyan inks are ejected. The head 90 is provided with arrays of ejection openings 90A, 90B and 90C from which the yellow, magenta and cyan inks are ejected, respectively. The arrays of ejection openings 90A, 90B and 90C are each composed of, for example, 80 ejection openings at intervals of 600 dpi.

Figure 9:
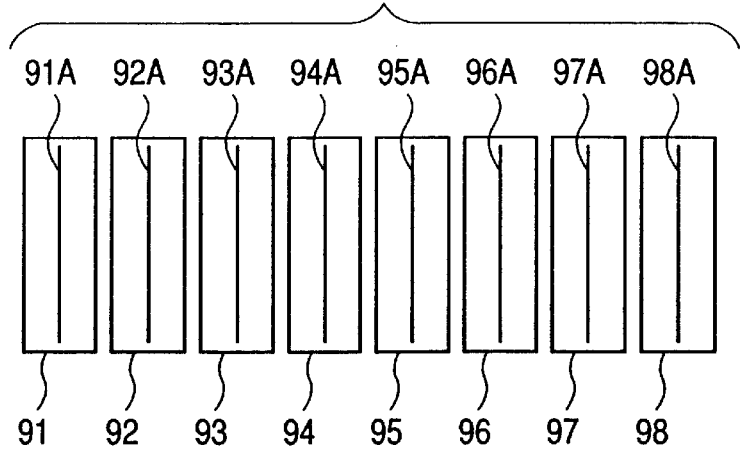
FIG. 9 illustrates the arrangements of recording heads and ejection openings according to another embodiment.

FIG. 9 is a schematic view illustrating another embodiment of the arrangements of the recording heads and ejection openings as shown in FIG. 8, and reference numerals 91 to 98 indicate recording heads. Reference numeral 91 designates a recording head provided with an array of ejection opening 91A from which a liquid composition is ejected, 92 a recording head provided with an array of ejection opening 92A from which a black ink is ejected, 93 a recording head provided with an array of ejection opening 93A from which a thick cyan ink is ejected, 94 a recording head provided with an array of ejection opening 94A from which a thick magenta ink is ejected, 95 a recording head provided with an array of ejection opening 95A from which a thick yellow ink is ejected, 96 a recording head provided with an array of ejection opening 96A from which a thin cyan ink is ejected, 97 a recording head provided with an array of ejection opening 97A from which a thin magenta ink is ejected, and 98 a recording head provided with an array of ejection opening 98A from which a thin yellow ink is ejected.

Figure 10:
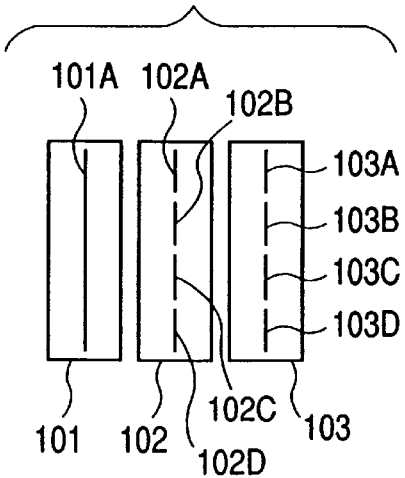
FIG. 10 illustrates the arrangements of recording heads and ejection openings according to a further embodiment.

FIG. 10 is a schematic view illustrating a further embodiment of the arrangements of the recording heads and ejection openings shown in FIG. 8. Reference numeral 101 indicates a recording head provided with an array of ejection opening 101A from which a liquid composition is ejected, and 102 a recording head provided with arrays of ejection openings 102A, 102B, 102C and 102D from which thick black, cyan, magenta and yellow inks are ejected, respectively. Reference numeral 103 designates a recording head provided with arrays of ejection openings 103A, 103B, 103C and 103D from which thin black, cyan, magenta and yellow inks are ejected, respectively.

Figure 12:
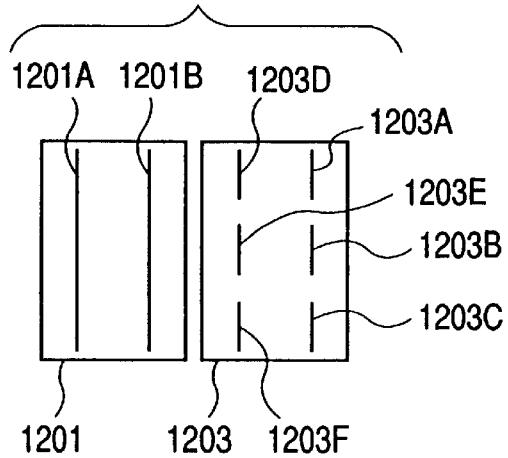
FIG. 12 illustrates the arrangements of recording heads and ejection openings according to a still further embodiment.

FIG. 12 is a schematic view illustrating a still further embodiment of the arrangements of the recording heads and ejection openings, in which two recording heads 1201 and 1203 are arranged. The recording head 1201 is provided with arrays of ejection openings 1201A and 1201B from which a liquid composition and a black ink are ejected, respectively. The arrays of ejection openings 1201A and 1201B are each composed of, for example, 304 ejection openings at intervals of 600 dpi. The recording head 1203 is provided with arrays of ejection openings 1203A, 1203B and 1203C from which thick yellow, magenta and cyan inks are ejected, respectively, and arrays of ejection openings 1203D, 1203E and 1203F from which thin yellow, magenta and cyan inks are ejected, respectively. The respective arrays of ejection openings 1203A to 1203F are each composed of 80 ejection openings at intervals of 600 dpi.

Figure 13:
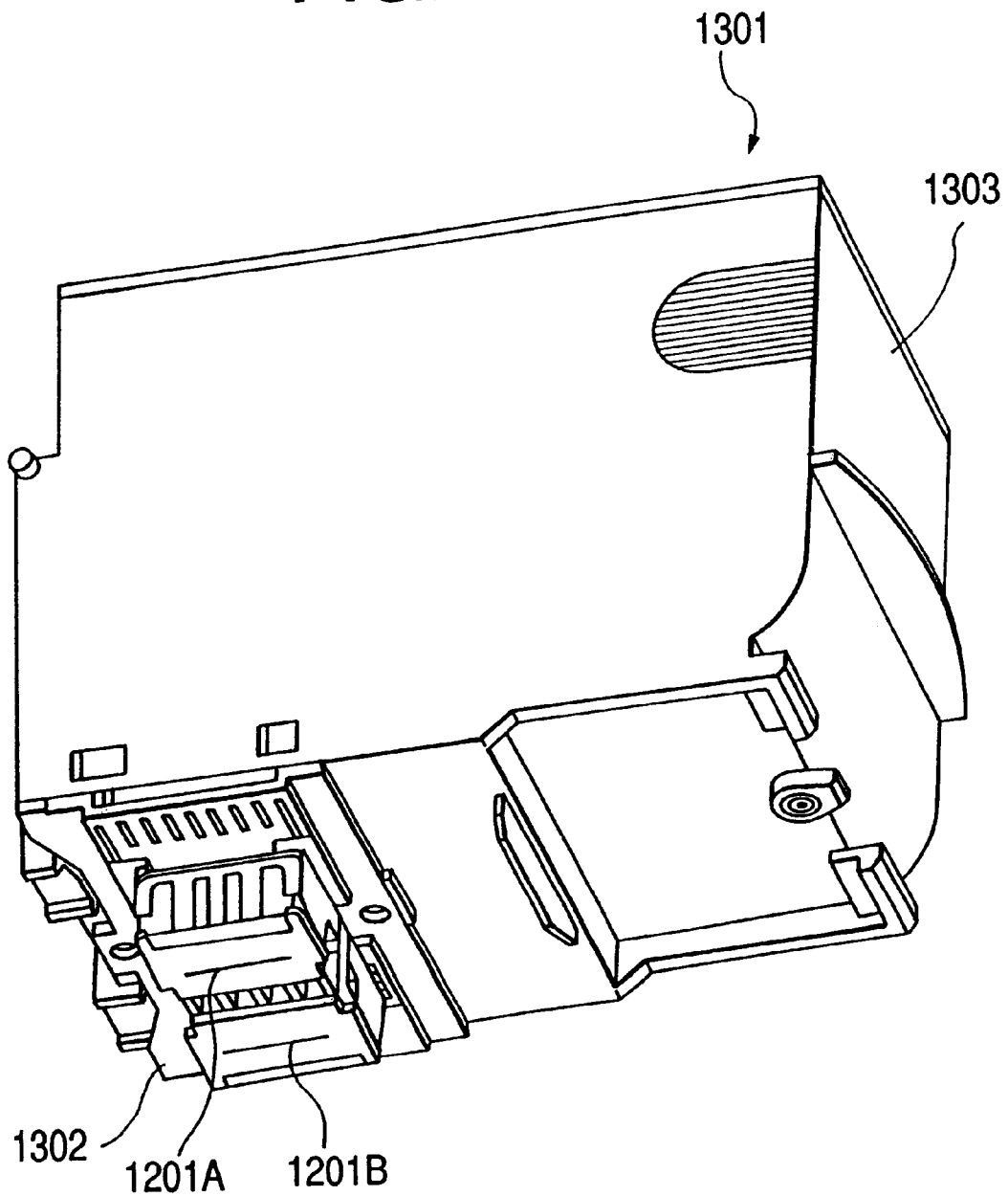
FIG. 13 is a schematic perspective view of another ink cartridge.

FIG. 13 is a schematic perspective view of a cartridge 1301 which is a constructional example of the recording head 1201 shown in FIG. 12, and in which a recording head portion, and a tank separately containing a liquid composition and a black ink are integrated. Reference numeral 1302 indicates an ejection tip integrally assembled by a top plate in the interior of which plural nozzles and orifices for ejecting droplets are formed in two rows, two heater boards in which plural heaters are formed as an energy-generating source for ejecting the droplets, and two fixing springs for fixing the respective heater boards to the top plate. Reference numeral 1303 indicates an ink tank which separately contains and holds the black ink and the liquid composition therein. The ejection tip 1302 and the ink tank 1303 are fixed integrally with each other. The liquid composition and black ink in the ink tank are respectively introduced into liquid chambers (not illustrated) in the recording head and ejected from the arrays of ejection openings 1201A and 1201B, respectively, in response to recording information. The liquid composition and the black ink are arranged in the same amount on this side and the other side of the drawing, respectively, in the ink tank 1303. The liquid composition and the black ink communicate with the ejection tip 1302 and are introduced respectively in the liquid chamber on this side of the drawing and the liquid chamber on the other side of the drawing in the ejection tip 1302. The liquid composition and the black ink are ejected from the array of ejection openings 1201A and the array of ejection opening 1201B, respectively.

Figure 14:
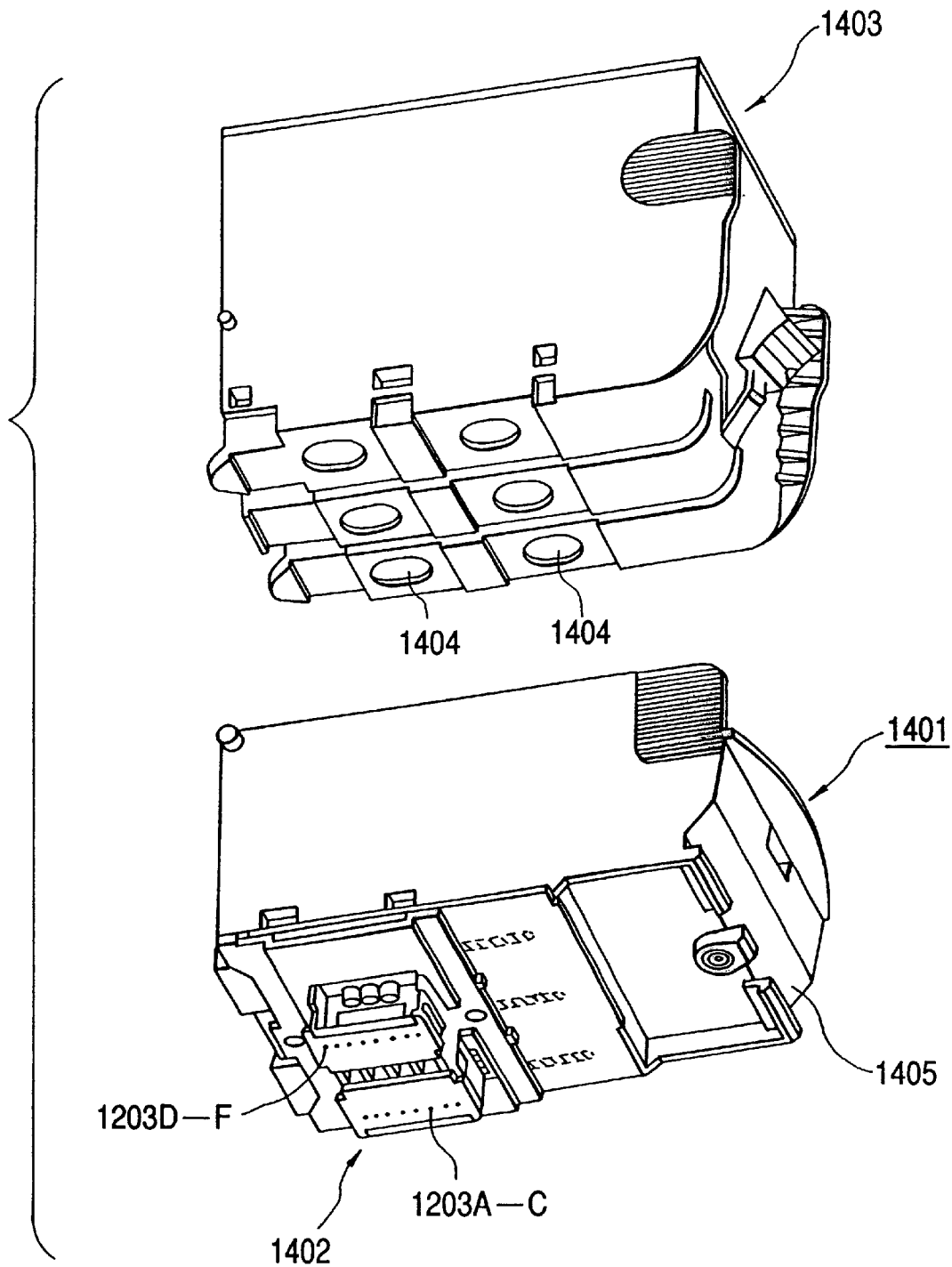
FIG. 14 is a schematic perspective view illustrating a recording head and an ink tank installed therein.

FIG. 14 is a schematic perspective view illustrating a recording head portion 1401 and an ink tank 1403 containing color inks and detachably installed in the recording head portion, which are a constructional example of the recording head 1203 shown in FIG. 12. Reference numeral 1402 indicates an ejection tip integrally assembled by a top plate in the interior of which plural nozzles and orifices for ejecting droplets are formed in two rows, two heater boards in which plural heaters are formed as an energy-generating source for ejecting the droplets, and two fixing springs for fixing the respective heater boards to the top plate. The ink tank 1403 separately contains and holds six color inks of a thick yellow ink, a thin yellow ink, a thick magenta ink, a thin magenta ink, a thick cyan ink and a thin cyan ink therein. The ink tank 1403 is detachably installed in an ink holder 1405 of the recording head portion 1401. At this time, the respective inks are fed to the recording head portion 1401 through respective ink feed openings 1404. More specifically, the six inks are communicated with the ejection tip 1402 by installing the ink tank 1403 in the ink holder 1405. The thick yellow, magenta and cyan inks are introduced in a liquid chamber (not illustrated), which is partitioned into three portions for the three colors, on the other side of the drawing in the ejection tip 1402, while the thin yellow, magenta and cyan inks are introduced in a liquid chamber (not illustrated), which is partitioned into three portions for the three colors, on this side of the drawing. The inks within the respective chambers are separately ejected from the respective arrays of ejection openings 1203A to 1203F in response to recording information.

Figure 15:
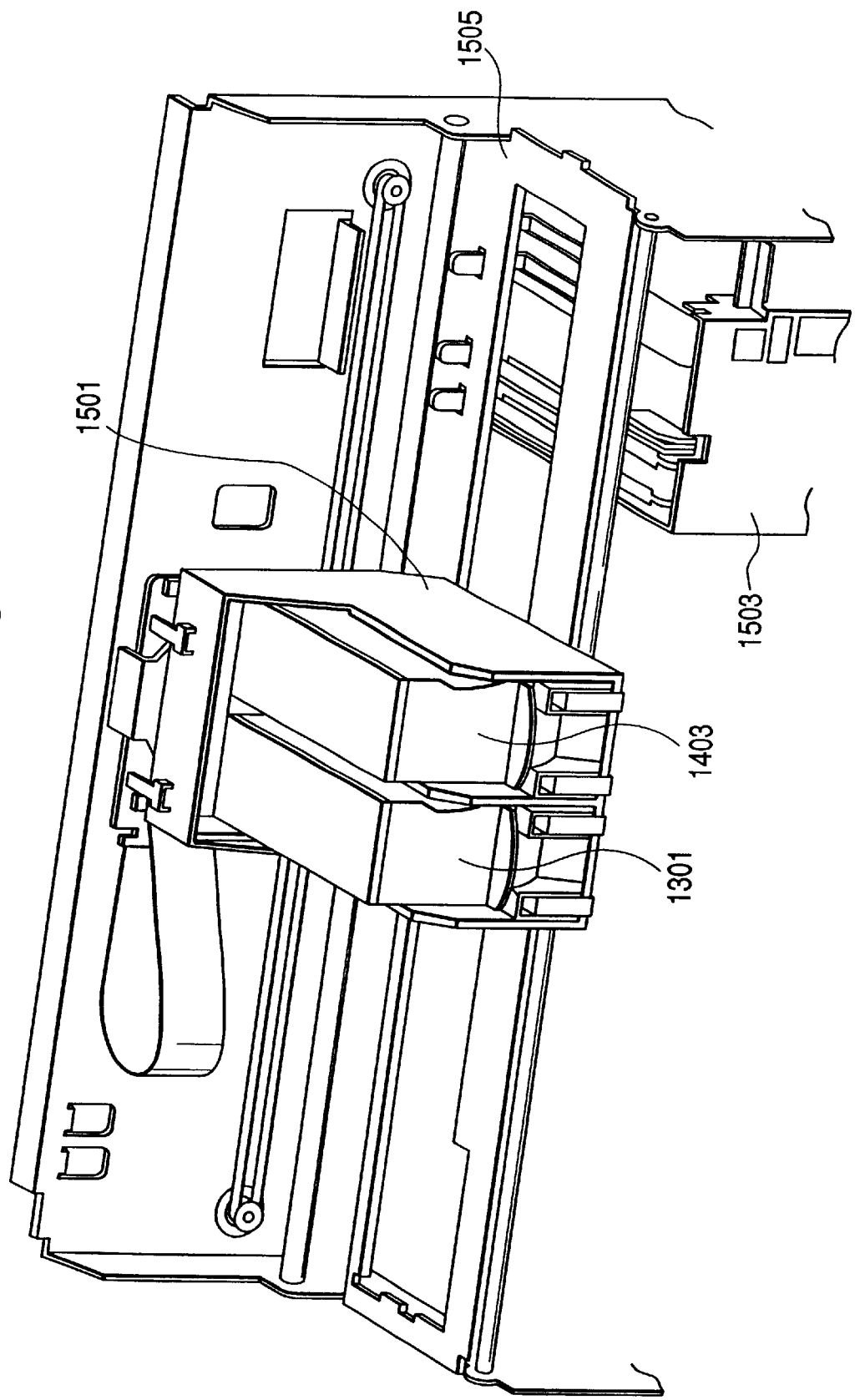
FIG. 15 is a schematic perspective view of a further ink-jet recording apparatus.

The cartridge 1301 illustrated in FIG. 13 and the recording head illustrated in FIG. 14 are mounted on, for example, a carriage 1501 of an ink-jet recording apparatus illustrated in FIG. 15, whereby such arrangements of recording heads and ejection openings shown in FIG. 12 can be realized. Reference numeral 1503 indicates a head recovery unit in which a head cap for preventing the drying of the ink from plural orifices formed on the tip of the head, from which the inks are ejected, and a suction pump for sucking the inks from the plural orifices upon operation failure of the head are incorporated. Reference numeral 1505 designates a platen on which a recording medium is conveyed. The home position of the carriage 1501 is situated over the recovery unit 1503, and printing is started by scanning the carriage 1501 on the left side of the drawing. A color reproducing region is enlarged by producing cyan (C), magenta (M) and yellow (Y) colors with two inks of thick and thin inks as described above, so that a high image quality like a photograph can be reproduced. In this case, color reproduction of highlight parts is increased in a photograph-like image, and so the amount of the thin inks used increases compared with the amount of the thick inks used. It is therefore necessary to increase the amount of the thin inks contained in the tank when six thick and thin inks of Y, M and C are contained in the same tank. Accordingly, the ink tank 1403 illustrated in FIG. 14 is so constituted that the thin inks and the thick inks are arranged on the right side and the left side of the drawing, respectively, and each thin ink is held twice as much as each thick ink.

An image formed article formed by using the image forming process according to the present invention is a very bright print free of any whitish haze. In particular, an image formed article obtained by forming a photograph-like image having highlight parts on a recording medium using the image forming process according to the present invention gives an impression of an extremely bright image formed article.

As described above, according to various embodiments of the present invention, there can be provided image forming processes by an ink-jet recording system, by which in the formation of color images on the so-called plain paper, high-definition images which have excellent water fastness and resistance to bleeding between color inks, and cause no whitish haze even in images having highlight parts can be provided on the plain paper.

The present invention will hereinafter be described more specifically by the following Examples and Comparative Examples. Incidentally, all designations of "part" or "parts" and "%" as will be used in the following examples mean part or parts by weight and % by weight unless expressly noted. In the following examples, peaks of molecular weight distribution as to cationic substances were determined by a GPC method making use of polyethylene oxide as a standard. The weight average molecular weight of each dispersing agent in inks containing a pigment was determined by a GPC method making use of a styrene polymer as a standard. The average particle diameter of the dispersing agent was determined in accordance with the dynamic light scattering process.

EXAMPLES 1 to 6

The following respective components were mixed into solutions, and the resultant solutions were then filtered under pressure through a membrane filter (Fluoropore Filter, trade name; product of Sumitomo Electric Industries, Ltd.) having a pore size of 0.46 $\mu$m, thereby obtaining Liquid Compositions A, B and C according to the present invention.

<Composition of Liquid Composition A>

| | |
|---|---|
| Triethylene glycol | 5 parts |
| Diethylene glycol | 6 parts |
| Polyethyleneimine hydrochloride (Epomine SP-012, trade name, product of Nippon Shokubai Kagaku Co., Ltd.) | 4 parts |
| Cetyltrimethylammonium chloride (LEBON TM-16, trade name, product of Sanyo Chemical Industries, Ltd.) | 1 part |
| Water | 84 parts. |

The weight average molecular weights of the cationic substances are as follows:

| | |
|---|---|
| Polyethyleneimine hydrochloride | 1200 |
| Cetyltrimethylammonium chloride | 310. |

<Composition of Liquid Composition B>

| | |
|---|---|
| Glycerol | 6 parts |
| Thiodiglycol | 5 parts |
| Polyallylamine hydrochloride | 4 parts |
| Benzalkonium chloride (Cation G50, trade name, product of Sanyo Chemical Industries, Ltd.) | 0.5 parts |
| Water | 84.5 parts. |

The weight average molecular weights of the cationic substances are as follows:

| | |
|---|---|
| Polyallylamine hydrochloride | 960 |
| Benzalkonium chloride | 300. |

<Composition of Liquid Composition C>

| | |
|---|---|
| Stearyltrimethylammonium chloride (Electrostripper QE, trade name, product of Kao Corporation) | 2 parts |
| Polyallylamine acetate | 10 parts |
| Thiodiglycol | 10 parts |
| Water | 78 parts. |

The weight average molecular weights of the cationic substances are as follows:

| | |
|---|---|
| Stearyltrimethylammonium chloride | 340 |
| Polyallylamine acetate | 1000. |

The preparation of Ink Subsets 1 and 2 used in the present invention will now be described.

[Preparation of Ink Subset 1]

The following respective components were mixed and thoroughly stirred into solutions, and the resultant solutions were filtered under pressure through a Fluoropore Filter (trade name; product of Sumitomo Electric Industries, Ltd.) having a pore size of 0.45 μm, thereby obtaining Inks Y1-a and Y1-b, M1-a and M1-b, C1-a and C1-b, and Bk1-a and Bk1-b of yellow, magenta, cyan and black colors, respectively, according to the present invention. The Inks Y1-a, Y1-b, M1-a, M1-b, C1-a, C1-b, Bk1-a and Bk1-b are referred to as Ink Subset 1 collectively.

Yellow Ink Y1-a (thick ink):

| | |
|---|---|
| C.I. Direct Yellow 132 | 3 parts |
| Thiodiglycol | 8 parts |
| Ethylene glycol | 8 parts |
| Acetylenol EH (trade name, product of Kawaken Fine Chemicals Co., Ltd.) | 0.3 parts |
| Water | 80.7 parts. |

Yellow Ink Y1-b (thin ink; pH: 10.6):

| | |
|---|---|
| C.I. Direct Yellow 132 | 0.7 parts |
| Thiodiglycol | 8 parts |
| Ethylene glycol | 8 parts |
| Acetylenol EH (trade name, product of Kawaken Fine Chemicals Co., Ltd.) | 0.3 parts |
| Lithium hydroxide | 0.05 parts |
| Water | 82.95 parts. |

Magenta Ink M1-a (thick ink):

| | |
|---|---|
| C.I. Acid Red 289 | 2 parts |
| Glycerol | 6 parts |
| Urea | 7 parts |
| Acetylenol EH (trade name, product of Kawaken Fine Chemicals Co., Ltd.) | 0.3 parts |
| Water | 84.7 parts. |

Magenta Ink M1-b (thin ink; pH: 10.8):

| | |
|---|---|
| C.I. Acid Red 289 | 0.5 parts |
| Glycerol | 6 parts |
| Urea | 7 parts |
| Acetylenol EH (trade name, product of Kawaken Fine Chemicals Co., Ltd.) | 0.3 parts |
| Sodium hydroxide | 0.07 parts |
| Water | 86.13 parts. |

Cyan Ink C1-a (thick ink):

| | |
|---|---|
| C.I. Direct Blue 86 | 3 parts |
| Ethylene glycol | 7 parts |
| Diethylene glycol | 10 parts |
| Acetylenol EH (trade name, product of Kawaken Fine Chemicals Co., Ltd.) | 0.3 parts |
| Water | 79.7 parts. |

Cyan Ink C1-b (thin ink; pH: 10.7):

| | |
|---|---|
| C.I. Direct Blue 86 | 0.5 parts |
| Ethylene glycol | 7 parts |
| Diethylene glycol | 10 parts |
| Acetylenol EH (trade name, product of Kawaken Fine Chemicals Co., Ltd.) | 0.3 parts |
| Lithium hydroxide | 0.06 parts |
| Water | 82.14 parts. |

Black Ink Bk1-a (thick ink):

The following components were mixed, and the mixture was heated to 70° C. in a water bath, thereby completely dissolving the resin.

| | |
|---|---|
| Styrene-acrylic acid-acrylic ester terpolymer (acid value: 160; weight average molecular weight: 8,000) | 1.5 parts |
| Monoethanolamine | 1.2 parts |
| Ion-exchanged water | 81.5 parts. |

After 10 parts of carbon black (MCF88, trade name; product of Mitsubishi Chemical Industries Limited) and 1 part of isopropyl alcohol were added to this solution to premix the components for 30 minutes, the resultant premix was subjected to a dispersion treatment under the following conditions.

Dispersing machine: sand grinder (manufactured by Igarashi Kikai K.K.)

Grinding medium: zirconia beads

Packing rate of grinding medium: 50% (by volume)

Grinding time: 3 hours.

The thus-treated mixture was further subjected to a centrifugal treatment (at 12,000 rpm for 20 minutes) to remove coarse particles, thereby preparing a liquid dispersion.

The following components were then mixed to obtain Black Ink Bk1-a having pH of 9.5.

| Dispersion described above | 30 parts |
| --- | --- |
| Glycerol | 8 parts |
| Diethylene glycol | 8 parts |
| Ethylene glycol | 5 parts |
| Isopropyl alcohol | 3.5 parts |
| Water | 45.5 parts. |

Black Ink Bk1-b (thin ink; pH: 10.9):

| Dispersion described above | 10 parts |
| --- | --- |
| Glycerol | 8 parts |
| Diethylene glycol | 8 parts |
| Ethylene glycol | 5 parts |
| Isopropyl alcohol | 3.5 parts |
| Sodium hydroxide | 0.08 parts |
| Water | 65.42 parts. |

[Preparation of Ink Subset 2]

The following respective components were mixed and thoroughly stirred into solutions, and the resultant solutions were filtered under pressure through a Fluoropore Filter (trade name; product of Sumitomo Electric Industries, Ltd.) having a pore size of 0.45 μm, thereby obtaining Inks Y2-a and Y2-b, M2-a and M2-b, C2-a and C2-b, and Bk2-a and Bk2-b of yellow, magenta, cyan and black colors, respectively, according to the present invention. The Inks Y2-a, Y2-b, M2-a, M2-b, C2-a, C2-b, Bk2-a and Bk2-b are referred to as Ink Subset 2 collectively.

Yellow Ink Y2-a (thick ink):

| Project Fast Yellow 2 (trade name, product of Zeneca Co.) | 2.0 parts |
| --- | --- |
| C.I. Direct Yellow 86 | 1.0 parts |
| Thiodiglycol | 8 parts |
| Ethylene glycol | 8 parts |
| Acetylenol EH (trade name, product of Kawaken Fine Chemicals Co., Ltd.) | 0.2 parts |
| Isopropyl alcohol | 4 parts |
| Water | 76.8 parts. |

Yellow Ink Y2-b (thin ink; pH: 10.6):

| Project Fast Yellow 2 (trade name, product of Zeneca Co.) | 0.5 parts |
| --- | --- |
| C.I. Direct Yellow 86 | 0.3 parts |
| Thiodiglycol | 8 parts |
| Ethylene glycol | 8 parts |
| Acetylenol EH (trade name, product of Kawaken Fine Chemicals Co., Ltd.) | 0.2 parts |
| Isopropyl alcohol | 4 parts |
| Lithium hydroxide | 0.05 parts |
| Water | 78.95 parts. |

Magenta Ink M2-a (thick ink):

| Project Fast Magenta 2 (trade name, product of Zeneca Co.) | 3 parts |
| --- | --- |
| Glycerol | 7 parts |
| Urea | 7 parts |
| Acetylenol EH (trade name, product of Kawaken Fine Chemicals Co., Ltd.) | 0.2 parts |
| Isopropyl alcohol | 4 parts |
| Water | 78.8 parts. |

Magenta Ink M2-b (thin ink; pH: 10.7):

| Project Fast Magenta 2 (trade name, product of Zeneca Co.) | 0.6 parts |
| --- | --- |
| Glycerol | 7 parts |
| Urea | 7 parts |
| Acetylenol EH (trade name, product of Kawaken Fine Chemicals Co., Ltd.) | 0.2 parts |
| Sodium hydroxide | 0.06 parts |
| Isopropyl alcohol | 4 parts |
| Water | 81.14 parts. |

Cyan Ink C2-a (thick ink):

| C.I. Direct Blue 199 | 3 parts |
| --- | --- |
| Ethylene glycol | 7 parts |
| Diethylene glycol | 10 parts |
| Acetylenol EH (trade name, product of Kawaken Fine Chemicals Co., Ltd.) | 0.3 parts |
| Water | 79.7 parts. |

Cyan Ink C2-b (thin ink; pH: 10.7):

| C.I. Direct Blue 199 | 0.5 parts |
| --- | --- |
| Ethylene glycol | 7 parts |
| Diethylene glycol | 10 parts |
| Acetylenol EH (trade name, product of Kawaken Fine Chemicals Co., Ltd.) | 0.3 parts |
| Lithium hydroxide | 0.07 parts |
| Water | 82.13 parts. |

Black Ink Bk2-a (thick ink):

| C.I. Direct Black 195 | 2.5 parts |
| --- | --- |
| 2-Pyrrolidone | 10 parts |
| Glycerol | 5 parts |
| Isopropyl alcohol | 4 parts |
| Sodium hydroxide | 0.4 parts |
| Water | 78.1 parts. |

Black Ink Bk2-b (thin ink; pH: 11.1):

| C.I. Direct Black 195 | 0.6 parts |
| --- | --- |
| 2-Pyrrolidone | 10 parts |
| Glycerol | 5 parts |
| Isopropyl alcohol | 4 parts |
| Sodium hydroxide | 0.1 parts |
| Water | 80.3 parts. |

The thus-obtained liquid compositions and ink subsets were combined in a manner shown in Table 1 to make up ink sets, and recording was conducted on PPC paper (product of Canon Inc.). Recording heads and ejection openings were arranged as illustrated in FIG. 8, and five recording heads were mounted on a carriage of an ink-jet recording apparatus shown in FIG. 11 to form color images. At this time, the liquid composition in each ink set was first ejected to apply it to the recording paper in advance, after which the respective inks were applied. The individual recording heads used had a recording density of 600 dpi, and were driven under conditions of a drive frequency of 6 kHz. The ejection quantity of the ink per dot when using the recording head having a recording density of 600 dpi was 15 ng for the yellow, magenta and cyan inks and the liquid composition and 30 ng for the black ink. The liquid composition was applied in a proportion of 50% duty for the black inks and 33% duty for the color inks.

Incidentally, these recording conditions are the same throughout Examples and Comparative Examples.

TABLE 1

|  | Liquid composition | Ink subset |
|---|---|---|
| Example 1 | A | 1 |
| Example 2 | B | 1 |
| Example 3 | C | 1 |
| Example 4 | A | 2 |
| Example 5 | B | 2 |
| Example 6 | C | 2 |

COMPARATIVE EXAMPLES 1 to 3

[Preparation of Ink Subset 3]

The following respective components were mixed and thoroughly stirred into solutions, and the resultant solutions were filtered under pressure through a Fluoropore Filter (trade name; product of Sumitomo Electric Industries, Ltd.) having a pore size of 0.45 µm, thereby obtaining Inks Y3-a and Y3-b, M3-a and M3-b, C3-a and C3-b, and Bk3-a and Bk3-b of yellow, magenta, cyan and black colors, respectively, of Comparative Examples. The Inks Y3-a, Y3-b, M3-a, M3-b, C3-a, C3-b, Bk3-a and Bk3-b are referred to as Ink Subset 3 collectively.

Yellow Ink Y3-a (thick ink):

| Project Fast Yellow 2 (trade name product of Zeneca Co.) | 2.0 parts |
|---|---|
| C.I. Direct Yellow 86 | 1.0 parts |
| Thiodiglycol | 8 parts |
| Ethylene glycol | 8 parts |
| Acetylenol EH (trade name, product of Kawaken Fine Chemicals Co., Ltd.) | 0.2 parts |
| Isopropyl alcohol | 4 parts |
| Water | 76.8 parts. |

Yellow Ink Y3-b (thin ink; pH: 8.7):

| Project Fast Yellow 2 (trade name, product of Zeneca Co.) | 0.5 parts |
|---|---|
| C.I. Direct Yellow 86 | 1.0 parts |
| Thiodiglycol | 8 parts |
| Ethylene glycol | 8 parts |
| Acetylenol EH (trade name, product of Kawaken Fine Chemicals Co., Ltd.) | 0.2 parts |
| Isopropyl alcohol | 4 parts |
| Water | 78.30 parts. |

Magenta Ink M3-a (thick ink):

| Project Fast Magenta 2 (trade name, product of Zeneca Co.) | 3 parts |
|---|---|

-continued

| Glycerol | 7 parts |
|---|---|
| Urea | 7 parts |
| Acetylenol EH (trade name, product of Kawaken Fine Chemicals Co., Ltd.) | 0.2 parts |
| Isopropyl alcohol | 4 parts |
| Water | 78.8 parts. |

Magenta Ink M3-b (thin ink; pH: 8.5):

| Project Fast Magenta 2 (trade name, product of Zeneca Co.) | 0.6 parts |
|---|---|
| Glycerol | 7 parts |
| Urea | 7 parts |
| Acetylenol EH (trade name, product of Kawaken Fine Chemicals Co., Ltd.) | 0.2 parts |
| Isopropyl alcohol | 4 parts |
| Water | 81.2 parts. |

Cyan Ink C3-a (thick ink):

| C.I. Direct Blue 199 | 3 parts |
|---|---|
| Ethylene glycol | 7 parts |
| Diethylene glycol | 10 parts |
| Acetylenol EH (trade name, product of Kawaken Fine Chemicals Co., Ltd.) | 0.3 parts |
| Water | 79.7 parts. |

Cyan Ink C3-b (thin ink; pH: 7.5):

| C.I. Direct Blue 199 | 0.5 parts |
|---|---|
| Ethylene glycol | 7 parts |
| Diethylene glycol | 10 parts |
| Acetylenol EH (trade name, product of Kawaken Fine Chemicals Co., Ltd.) | 0.3 parts |
| Water | 82.2 parts. |

Black Ink Bk3-a (thick ink):

| C.I. Direct Black 195 | 2.5 parts |
|---|---|
| 2-Pyrrolidone | 10 parts |
| Glycerol | 5 parts |
| Isopropyl alcohol | 4 parts |
| Sodium hydroxide | 0.4 parts |
| Purified water | 78.1 parts. |

Black Ink Bk3-b (thin ink; pH: 9.5):

| C.I. Direct Black 195 | 0.6 parts |
|---|---|
| 2-Pyrrolidone | 10 parts |
| Glycerol | 5 parts |
| Isopropyl alcohol | 4 parts |
| Sodium hydroxide | 0.1 parts |
| Purified water | 80.3 parts. |

Printing was conducted in the same manner as in Examples 1 to 6 except that Liquid Compositions A, B and C and Ink Subset 3 (Y3-a, Y3-b, M3-a, M3-b, C3-a, C3-b, Bk3-a and Bk3-b) were combined as shown in Table 2.

TABLE 2

|  | Liquid composition | Ink subset |
| --- | --- | --- |
| Comp. Example 1 | A | 3 |
| Comp. Example 2 | B | 3 |
| Comp. Example 3 | C | 3 |

[Evaluation methods and evaluation standards]

The recorded images obtained in Examples 1 to 6 and Comparative Examples 1 to 3 were evaluated in accordance with the following evaluation methods and evaluation standards. The results are shown in Table 3.

TABLE 3

|  | Whitish haze | Water fastness | Bleeding |
| --- | --- | --- | --- |
| Example 1 | A | A | A |
| Example 2 | A | A | A |
| Example 3 | A | A | A |
| Example 4 | A | A | A |
| Example 5 | A | A | A |
| Example 6 | A | A | A |
| Comp. Ex. 1 | B | A | A |
| Comp. Ex. 2 | B | A | A |
| Comp. Ex. 3 | B | A | A |

(1) Evaluation of Whitish Haze:

A photograph-like image having highlight parts was printed with each ink set to visually observe whether whitish haze occurred or not in the highlight parts. Evaluation was made in accordance with the following standard:

A: No whitish haze was observed;

B: Whitish haze was slightly observed by a close look at the image;

C: Whitish haze was clearly observed.

(2) Evaluation of Water Fastness:

After solid printed images, and English characters and numerals of yellow, magenta, cyan and black colors were printed with each ink set by the printer, and the resulting print samples were left to stand for 1 hour, they were immersed for 10 seconds in tap water of 20° C. Thereafter, they were taken out of the water and air-dried as they are to visually evaluate the images as to water fastness. Among the yellow, magenta, cyan and black inks, the ink poorest in water fastness was taken as the evaluation result of water fastness. The water fastness was ranked in accordance with the following standard:

A: No ink bleeding toward the blank portion of the recording medium occurred, greasing was scarcely recognized, and blurring of the English characters and numerals also scarcely occurred;

B: Ink bleeding toward the blank portion of the recording medium slightly occurred, and the English characters and numerals were somewhat blurred, but no problem arose from the viewpoint of practical use;

C: Ink bleeding toward the blank portion of the recording medium occurred to a significant extent, greasing was markedly observed, and marked blurring of the English characters and numerals also occurred.

(3) Resistance to Bleeding:

Solid printed images of yellow, magenta, cyan and black colors were printed in contiguity with one another with the combinations of the liquid composition and the yellow, magenta, cyan and black inks in each ink set in accordance with the same printing mode as the printing mode E (1 pass, one-direction printing), thereby visually observing the degree of bleeding at boundaries between the inks of different colors. The resistance to bleeding was ranked in accordance with the following standard:

A: Bleeding scarcely occurred;

B: Bleeding slightly occurred, but no problem arose from the viewpoint of practical use;

C: Bleeding occurred to a significant extent.

What is claimed is:

1. A process for printing on a recording medium comprising the steps of:

(i) applying on the recording medium a liquid composition containing a cationic substance; and (ii) applying on the recording medium an ink containing an anionic substance, wherein the liquid composition and the ink are applied so as to come into contact with each other, and wherein the ink contains a coloring material at a concentration of not higher than 1 wt % and has a pH of 10.5 or higher.

2. The process according to claim 1, wherein the pH is 10.7 or higher.

3. The process according to claim 1, wherein the ratio per unit area of the liquid composition to the ink on the recording medium is within a range of from 1:10 to 8:10 (liquid composition:ink).

4. The process according to claim 1, wherein the ink is a black ink.

5. The process according to claim 1, wherein the ink is a color ink.

6. The process according to claim 1, wherein the cationic substance is a high-molecular weight cationic compound whose weight average molecular weight ranges from 400 to 1400.

7. The process according to claim 1, wherein the cationic substance contains a quaternary ammonium group having an alkyl group having at least 8 carbon atoms.

8. The process according to claim 6, wherein the cationic substance is polyallylamine.

9. The process according to claim 1, wherein step (i) is conducted prior to step (ii).

10. The process according to claim 1, wherein step (ii) is conducted prior to step (i).

11. The process according to claim 1, wherein step (ii) is performed twice, and step (i) is performed between the two performances of step (ii).

12. The process according to claim 1, wherein the application of the liquid composition is conducted by an ink-jet recording method in which the liquid composition is ejected from orifices in response to a recording signal.

13. The process according to claim 12, wherein the ink-jet recording method comprises a step of applying thermal energy to the liquid composition to eject the liquid composition.

14. The process according to claim 1, wherein the application of the ink is conducted by an ink-jet recording method in which the ink is ejected from orifices in response to a recording signal.

15. The process according to claim 14, wherein the ink-jet recording method comprises a step of applying thermal energy to the ink to eject the ink.

16. An image forming process comprising the steps of:

(i) applying to a recording medium a liquid composition containing a cationic substance; and (ii) applying to a recording medium at least one of a first ink and a second ink, each of the first and second inks containing an anionic substance, and having the same color tone, and the concentration of a coloring material in the second ink being lower than that of the first ink, wherein the liquid composition and the at least one of the first and second inks are applied so as to come into contact with each other, and wherein the concentration of the coloring material of the second ink is not higher than 1 wt %, and the second ink has a pH of 10.5 or higher.

17. The process according to claim 16, wherein the second ink has a pH of 10.7 or higher.

18. The process according to claim 16, wherein the ratio per unit area of the liquid composition to the ink on the recording medium is within a range of from 1:10 to 8:10 (liquid composition:ink).

19. The process according to claim 16, wherein the first and second inks are black inks.

20. The process according to claim 16, wherein the first and second inks are color inks.

21. The process according to claim 16, wherein the cationic substance is a high molecular weight compound whose weight average molecular weight ranges from 400 to 1400.

22. The process according to claim 21, wherein the cationic substance is polyallylamine.

23. The process according to claim 16, wherein the cationic substance contains a quaternary ammonium group having an alkyl group having at least 8 carbon atoms.

24. The process according to claim 23, wherein the cationic substance is benzalkonium chloride.

25. The process according to claim 16, wherein the steps include applying the liquid composition to the recording medium and then applying at least one of the inks to the recording medium so that the liquid composition and the at least one of the inks come into contact with each other.

26. The process according to claim 16, wherein the steps include applying at least one of the inks to the recording medium and then applying the liquid composition to the recording medium so that the at least one of the inks and the liquid composition come into contact with each other.

27. The process according to claim 16, wherein the steps include applying at least one of the inks, then applying the liquid composition and then applying at least one of the inks so that the respective at least one of the inks, liquid composition, and at least one of the inks come into contact with each other.

28. The process according to claim 16, wherein the application of the liquid composition is conducted by an ink-jet recording method in which the liquid composition is ejected from orifices in response to recording signals.

29. The process according to claim 28, wherein the ink jet recording method is a method in which thermal energy is applied to the liquid composition to eject the liquid composition.

30. The process according to claim 16, wherein the application of the ink is conducted by an ink-jet recording method in which the ink is ejected from orifices in response to recording signals.

31. The process according to claim 30, wherein the ink-jet recording method is a method in which thermal energy is applied to the ink to eject the ink.

32. An image forming process comprising the steps of:
(i) providing
(i-1) a liquid composition containing a cationic substance,
(i-2) inks of a first color including a first ink and a second ink, the first ink and the second ink containing an anionic substance, having the same color tone, and the concentration of a coloring material of the second ink being lower than that of the first ink, and
(i-3) inks of a second color different from the first color, including a third ink and a fourth ink each of which contains an anionic substance, the third and the fourth inks having the same color tone, and the concentration of a coloring material of the fourth ink being lower than that of the third ink,
(ii) applying to the recording medium the liquid composition; and
(iii) applying to the recording medium at least one of the first, second, third and fourth inks,
wherein the liquid composition and at least one of the first, second, third and fourth inks are applied to the recording medium so as to come into contact with each other, and
wherein at least one of the second and fourth inks contains a coloring material at a concentration of not higher than 1 wt % and has a pH of 10.5 or higher.

33. An image forming process comprising recording an image in an image forming region on a recording medium using inks of plural colors, which include a first yellow ink and a second yellow ink, each of which contains an anionic substance, the concentration of a coloring material of the second yellow ink being lower than that of the first yellow ink, two magenta inks including a first magenta ink and a second magenta ink, each of which contains an anionic substance, the concentration of a coloring material of the second magenta ink being lower than that of the first magenta ink, and two cyan inks including a first cyan ink and a second cyan ink, each of which contains an anionic substance, the concentration of a coloring material in the second cyan ink being lower than that of the first cyan ink, and a liquid composition containing a cationic substance, the process comprising the steps of:
(a) applying the liquid composition to the image forming region on the recording medium; and
(b) applying at least one ink selected from the group consisting of the first and second yellow inks, the first and second magenta inks and the first and second cyan inks to the image forming region,
wherein the liquid composition and at least one of the first and second yellow inks, the first and second magenta inks and the first and second cyan inks are applied so as to come into contact with each other, and
wherein at least one of the second yellow ink, the second magenta ink and the second cyan ink contains a coloring material at a concentration of not higher than 1 wt %, and has a pH of 10.5 or higher.

34. An image forming process comprising recording an image in an image forming region on a recording medium using a plurality of inks of different colors, which include two yellow inks including a first yellow ink and a second yellow ink, each of which contains an anionic substance, the concentration of a coloring material of the second yellow ink being lower than that of the first yellow ink, two magenta inks including a first magenta ink and a second magenta ink, each of which contains an anionic substance, the concentration of a coloring material of the second magenta ink being lower than that of the first magenta ink, two cyan inks including a first cyan ink and a second cyan ink, each of which contains an anionic substance, the concentration of a coloring material of the second cyan ink being lower than that of the first cyan ink, and two black inks including a first black ink and a second black ink, each of which contains an anionic substance, the concentration of a coloring material of the second black ink being lower than that of the first black ink, and a liquid composition containing a cationic substance, the process comprising the steps of:

(a) applying the liquid composition to the image forming region on the recording medium; and (b) applying to the image forming region at least one ink selected from the group consisting of the first and second yellow inks, the first and second magenta inks, the first and second cyan inks, and the first and second black inks, wherein the liquid composition and the ink selected from the group consisting of the first and second yellow inks, the first and second magenta inks, the first and second cyan inks, and the first and second black inks are applied so as to come into contact with each other, and wherein at least one of the second yellow ink, the second magenta ink, the second cyan ink and the second black ink contains a coloring material at a concentration of not higher than 1 wt %, and has a pH of 10.5 or higher.

35. The image forming process according to claim 33 or 34, wherein the weight average molecular weight of the cationic substance ranges from 400 to 1400 as measured by means of GPC.

36. The image forming process according to claim 33 or 34, wherein the liquid composition comprises a quaternary ammonium compound having an alkyl group having at least 8 carbon atoms.

37. The image forming process according to claim 33 or 34, wherein the cationic substance is polyallylamine.

38. The image forming process according to claim 34, wherein ejection quantities of the liquid composition and at least one of the yellow inks, cyan inks and magenta inks are each 2 to 40 ng per dot, and ejection quantities of the black inks are 2 to 80 ng per dot.

39. An ink set comprising, in combination, (i) a liquid composition containing a cationic substance, (ii) a first ink containing an anionic substance, and (iii) a second ink containing an anionic substance, wherein the first and second inks have the same color tone, and the concentration of a coloring material in the second ink is lower than that of the first ink, and wherein the second ink contains a coloring material at a concentration of not more than 1 wt %, and has a pH of 10.5 or higher.

40. The ink set according to claim 39, wherein the second ink has a pH of 10.7 or higher.

41. The ink set according to claim 39, wherein the cationic substance is a high-molecular weight cationic substance whose weight average molecular weight ranges from 400 to 1400 as measured by means of GPC.

42. The ink set according to claim 41, wherein the cationic substance is polyallylamine.

43. The ink set according to claim 39, wherein the cationic substance contains a quaternary ammonium group having an alkyl group of 8 or more carbon atoms.

44. The ink set according to claim 43, wherein the cationic substance is benzalkonium chloride.

45. The ink set according to claim 39, wherein the inks are black.

46. The ink set according to claim 39, wherein the inks are yellow, magenta or cyan.

47. An ink set comprising, in combination, (i) a liquid composition containing a cationic substance, (ii) inks of a first color including a first ink and a second ink, each of which contains an anionic substance, the first and second inks having the same color tone, and the concentration of a coloring material of the second ink being lower than that of the first ink, and (iii) inks of a second color different from the first color, including a third ink and a fourth ink, each of which contains an anionic substance, the third and fourth inks having the same color tone, and the concentration of a coloring material of the fourth ink being lower than that of the third ink, wherein at least one of the second ink and the fourth ink contains a coloring material at a concentration of not higher than 1 wt % and has a pH of 10.5 or higher.

48. An ink set for ink jet recording with a liquid composition containing a cationic compound, comprising, in combination, (i) inks of a first color including a first ink and a second ink, each of which contains an anionic dye or a pigment and an anionic compound, the first and second inks having the same color tone, and the concentration of a coloring material of the second ink being lower than that of the first ink, and (ii) inks of a second color different from the first color, including a third ink and a fourth ink, each of which contains an anionic dye or a pigment and an anionic compound, the third and fourth inks having the same color tone, and the concentration of a coloring material of the fourth ink being lower than that of the third ink, wherein at least one of the second ink and the fourth ink contains a coloring material at a concentration of not higher than 1 wt % and has a pH of 10.5 or higher.

49. An ink set comprising, in combination, (i) a liquid composition containing a cationic substance, and (ii) inks of yellow color including a first yellow ink and a second yellow ink, each of which contains an anionic substance, the concentration of a coloring material of the second yellow ink being lower than that of the first yellow ink, inks of magenta color including a first magenta ink and a second magenta ink, each of which contains an anionic substance, the concentration of a coloring material of the second magenta ink being lower than that of the first magenta ink, inks of cyan color including a first cyan ink and a second cyan ink, each of which contains an anionic substance, the concentration of a coloring material of the second cyan ink being lower than that of the first cyan ink, wherein at least one of the second yellow ink, the second magenta ink, and the second cyan ink contains a coloring material at a concentration of not higher than 1 wt % and has a pH of 10.5 or higher.

50. An ink set comprising, in combination, (i) a liquid composition containing a cationic substance, and (ii) inks of yellow color including a first yellow ink and a second yellow ink, each of which contains an anionic substance, the concentration of a coloring material of the second yellow ink being lower than that of the first yellow ink, inks of magenta color including a first magenta ink and a second magenta ink, each of which contains an anionic substance, the concentration of a coloring material of the second magenta ink being lower than that of the first magenta ink, inks of cyan color including a first cyan ink and a second cyan ink, each of which contains an anionic substance, the concentration of the second cyan ink being lower than that of the first cyan ink, and inks of black color including a first black ink and a second black ink, each of which contains an anionic substance, the concentration of a coloring material of the second black ink being lower than that of the first black ink, wherein at least one of the second yellow ink, the second magenta ink, the second cyan ink and the second black ink contains a coloring material at a concentration of not higher than 1 wt % and has a pH of 10.5 or higher.

51. A recording unit comprising:
(i) a liquid container portion containing a liquid composition containing a cationic substance,
(ii) an ink container portion containing a first ink and a second ink separately, each of the inks containing an anionic substance, the first and the second inks having the same color tone, and the concentration of a coloring material in the second ink being lower than that of the first ink, and
(iii) a head portion for ejecting the liquid composition, the first ink and the second ink, respectively, in the form of a droplet, wherein the second ink contains a coloring material at a concentration of not more than 1 wt %, and has a pH of 10.5 or higher.

52. A recording unit comprising:
(i) a liquid container portion containing a liquid composition containing a cationic substance,
(ii) an ink container portion containing
(ii-1) a first ink and a second ink separately, each of the first and second inks containing an anionic dye, or a pigment and an anionic compound, the first and second inks having the same color tone, and the concentration of a coloring material in the second ink being lower than that of the first ink, and
(ii-2) a third ink and a fourth ink separately, each of the third and fourth inks containing an anionic dye, or a pigment and an anionic compound, the third and fourth inks having the same color tone, and the concentration of a coloring material in the fourth ink being lower than that of the third ink, and
(iii) a head portion for ejecting the liquid composition, the first ink, the second ink, the third ink and the fourth ink, respectively, in the form of a droplet, wherein at least one of the second ink and the fourth ink contains a coloring material at a concentration of not more than 1 wt %, and has a pH of 10.5 or higher.

53. The recording unit according to claim 51 or 52, wherein the head portion is composed of a head which applies thermal energy to at least one of the inks and the liquid composition.

54. The recording unit according to claim 51 or 52, wherein the liquid container portion and the ink container portion are contained in an ink cartridge having a liquid feeding means and an ink feeding means.

55. The recording unit according to claim 51 or 52, wherein the container portions are formed of a polyolefin at their surfaces with which the liquid composition or ink come into contact.

56. The recording unit according to claim 51 or 52, wherein the container portions contain a liquid-or ink-absorbing member therein.

57. The recording unit according to claim 56, wherein the absorbing member is formed of polyurethane, cellulose or polyvinyl acetate.

58. An ink tank for use in an ink jet recording apparatus with a liquid composition containing a cationic substance, comprising:

(i) a first set of ink containers respectively containing inks of a first color including a first ink and a second ink, each of the first and second inks containing an anionic substance, the first and second inks having the same color tone, and the concentration of a coloring material of the second ink being lower than that of the first ink, and
(ii) a second set of ink containers respectively containing inks of a second color different from the first color, including a third ink and a fourth ink, each of the third and fourth inks containing an anionic substance, the third and fourth inks having the same color tone, and the concentration of a coloring material of the fourth ink being lower than that of the third ink, wherein at least one of the second ink and the fourth ink contains a coloring material at a concentration of not higher than 1 wt % and has a pH of 10.5 or higher.

59. A recording unit for use in an ink jet recording apparatus with a liquid composition containing a cationic substance, comprising:
(i) a first set of ink containers respectively containing inks of a first color including a first ink and a second ink, each of the first and second inks containing an anionic dye or a pigment and an anionic compound, the first and second inks having the same color tone, and the concentration of a coloring material of the second ink being lower than that of the first ink,
(ii) a second set of ink containers respectively containing inks of a second color different from the first color, including a third ink and a fourth ink, each of the third and fourth inks containing an anionic dye or a pigment and an anionic compound, the third and fourth inks having the same color tone, and the concentration of a coloring material of the fourth ink being lower than that of the third ink, and
(iii) a head portion for ejecting the first, second, third and fourth inks, respectively, in the form of a droplet, wherein at least one of the second ink and the fourth ink contains a coloring material at a concentration of not higher than 1 wt % and has a pH of 10.5 or higher.

60. The recording unit according to claim 59, wherein the head portion is composed of a head which applies thermal energy to the ink to eject droplets of the ink.

61. The recording unit according to claim 59, wherein the containers are formed of a polyolefin at their surfaces with which the ink comes into contact.

62. The recording unit according to claim 59, wherein the containers contain ink-absorbing members therein.

63. The recording unit according to claim 62, wherein the ink-absorbing members are formed of polyurethane, cellulose or polyvinyl acetate.

64. An image forming apparatus comprising:
(i) a liquid container portion containing a liquid composition containing a cationic substance,
(ii) an ink container portion containing a first ink and a second ink separately, each of the inks containing an anionic substance, the first and second inks having the same color tone, and the concentration of a coloring material in the second ink being lower than that of the first ink, and
(iii) a head portion for ejecting the liquid composition, the first ink and the second ink, respectively, in the form of a droplet, wherein the second ink contains a coloring material at a concentration of not more than 1 wt %, and has a pH of 10.5 or higher.

65. An image forming apparatus comprising a liquid container containing a liquid composition comprising a cationic compound, and a head portion for ejecting the liquid composition in the form of a droplet, and the recording unit according to claim 59.

66. The image forming apparatus according to claim 64 or 65, wherein the head portion is composed of a head which applies thermal energy to an ink to eject droplets of the ink.

67. An image formed article formed on a recording medium by the image forming process according to claim 16.

68. An image formed article formed on a recording medium by the image forming process according to any one of claims 32–34.

69. An image formed article formed on a recording medium by the image forming process according to claim 35.

70. An image formed article formed on a recording medium by the image forming process according to claim 36.

71. An image formed article formed on a recording medium by the image forming process according to claim 37.

72. A printing method comprising the steps of:
(i) providing a liquid composition, a first ink and a second ink, the liquid composition being reactive with each of the first and second inks, the first and second inks having the same color tone, the concentration of a coloring material of the second ink being lower than that of the first ink, and each of the first and second inks having a respective pH,
(ii) applying to a recording medium the liquid composition; and
(iii) applying to the recording medium at least one of the first and second inks,
wherein the liquid composition and at least one of the first and second inks are applied so as to come into contact with each other, and
wherein the pH of the second ink is set such that an image formed with the second ink and the liquid composition has no whitish haze, and an image formed with the liquid composition and the second ink has a whitish haze when the pH of the second ink is set to be the same as that of the first ink.

73. A printing method comprising the steps of:
(i) providing a liquid composition containing a cationic compound, a first ink and a second ink, each of the first and second inks containing an anionic coloring material, the first ink and the second ink having the same color tone, the concentration of the coloring material of the second ink being lower than that of the first ink, and each of the first and second inks having a respective pH,
(ii) applying to a recording medium the liquid composition, and
(iii) applying to the recording medium at least one of the first and second inks,
wherein the liquid composition and at least one of the first and second inks are applied so as to come into contact with each other, and
wherein the second ink has a pH higher than that of the first ink, and causes no whitish haze in an image formed with the liquid composition, and an image formed with the liquid composition and the second ink shows a whitish haze when the pH of the second ink is set to be the same as that of the first ink.

74. A process for alleviating a whitish haze in an image formed on a recording medium by an ink-jet process comprising the steps of:
(i) applying to the recording medium a liquid composition, and
(ii) applying to the recording medium at least one of a first ink and a second ink, each of which has the same color tone, the concentration of a coloring material of the second ink being lower than that of the first ink, each of the first and second inks being reactive with the liquid composition, and each of the first and second inks having a respective pH,
wherein the pH of the second ink is set such that an image formed with the second ink and the liquid composition has no whitish haze, and an image formed with the liquid composition and the second ink has a whitish haze when the pH of the second ink is set to be the same as that of the first ink.

75. A process for alleviating a whitish haze in an image formed on a recording medium by an ink-jet recording process comprising the steps of:
(i) applying to the recording medium a liquid composition containing a cationic compound; and
(ii) applying to the recording medium at least one of a first ink and a second ink, each of the first and second inks containing an anionic coloring material, having the same color tone, and having a respective pH, and the concentration of the coloring material of the second ink being lower than that of the first ink,
wherein the second ink has a pH higher than that of the first ink, and causes no whitish haze in an image formed with the liquid composition, and an image formed with the liquid composition and the second ink has a whitish haze when the pH of the second ink is set to be the same as that of the first ink.

* * * * *

UNITED STATES PATENT AND TRADEMARK OFFICE
CERTIFICATE OF CORRECTION

PATENT NO. : 6,299,675 B1
DATED : October 9, 2001
INVENTOR(S) : Ono et al.

It is certified that error appears in the above-identified patent and that said Letters Patent is hereby corrected as shown below:

Column 1,
Line 14, "these" should read -- this --.

Column 3,
Line 61, "suitably" should read -- suitable --.

Column 10,
Line 63, "as to" should read -- for --.

Column 11,
Line 7, "be" should read -- may be --.

Column 12,
Line 3, "that" should read -- that which is --.

Column 13,
Line 65, "is" should read -- be --.

Column 14,
Line 45, "various." should read -- various --; and
Line 48, "agent" should read -- agents --.

Column 16,
Lines 24 and 25, "the only" should read -- only the --; and
Line 47, "these compositions and" should read -- this composition and these --.

Column 18,
Line 36, "as" should be deleted.

Column 19,
Line 26, "in" should be deleted;
Line 30, "that" should read -- in which --;
Lines 62, 63 and 65, "opening" should read -- openings --; and
Line 67, "opening" should read -- openings --.

UNITED STATES PATENT AND TRADEMARK OFFICE
CERTIFICATE OF CORRECTION

PATENT NO. : 6,299,675 B1
DATED : October 9, 2001
INVENTOR(S) : Ono et al.

It is certified that error appears in the above-identified patent and that said Letters Patent is hereby corrected as shown below:

Column 20,
Lines 2, 4, 6 and 8, "opening" should read -- openings --; and
Line 64, "opening" should read -- openings --.

Column 29,
Table 3, line 24, "Comp.Ex. 2" should read -- Comp. Ex. 2 --.

Column 35,
Line 57, "or ink come" should read -- or ink comes --; and
Line 60, "liquid-or-ink-" should read -- liquid-or-ink- --.

Signed and Sealed this

Eighteenth Day of February, 2003

JAMES E. ROGAN
*Director of the United States Patent and Trademark Office*